United States Patent

Luther et al.

[19]

[11] Patent Number: 6,005,680
[45] Date of Patent: Dec. 21, 1999

[54] METHOD FOR CAPTURING A DOCUMENT IMAGE, A SCANNER USING THE METHOD AND A DOCUMENT IMAGE MANAGEMENT SYSTEM USING THE SCANNER

[75] Inventors: Willis J. Luther, Irvine, Calif.; Thomas S. Tullis, Easton, Mass.; Shin-Ywan Wang, Tustin, Calif.; Toshiaki Yagasaki, Kawasaki, Japan

[73] Assignee: Canon Information Systems, Inc., Irvine, Calif.

[21] Appl. No.: 08/416,207

[22] Filed: Apr. 4, 1995

[51] Int. Cl.⁶ .............................. H04N 1/40; H04N 1/46; G06K 9/34

[52] U.S. Cl. ................ 358/456; 358/505; 358/534; 358/455; 358/462; 382/176

[58] Field of Search ................ 358/505, 512, 358/514, 515, 534, 455, 456, 462; 382/176, 305

[56] References Cited

U.S. PATENT DOCUMENTS

| | | | |
|---|---|---|---|
| 4,503,556 | 3/1985 | Scherl et al. | 382/9 |
| 4,504,972 | 3/1985 | Scherl et al. | 382/51 |
| 4,722,064 | 1/1988 | Suzuki | 362/518 |
| 4,730,219 | 3/1988 | Oshikoshi et al. | 358/280 |
| 4,739,397 | 4/1988 | Hayashi | 358/80 |
| 4,750,044 | 6/1988 | Nakajima | 358/483 |
| 4,750,209 | 6/1988 | Shimura et al. | 382/9 |
| 4,757,351 | 7/1988 | Birgmeir | 358/505 |
| 4,782,399 | 11/1988 | Sato | 358/280 |
| 4,817,187 | 3/1989 | Lien | 382/56 |
| 4,879,753 | 11/1989 | El-Sherbini | 382/176 |
| 4,942,461 | 7/1990 | Abe et al. | 358/75 |
| 5,003,614 | 3/1991 | Tanaka et al. | 382/171 |
| 5,007,098 | 4/1991 | Kumagai | 382/21 |
| 5,033,104 | 7/1991 | Amano | 382/56 |
| 5,101,438 | 3/1992 | Kanda et al. | 382/9 |

(List continued on next page.)

FOREIGN PATENT DOCUMENTS

| | | | |
|---|---|---|---|
| 325417 | 7/1989 | European Pat. Off. | G06F 15/62 |
| 411921 | 2/1991 | European Pat. Off. | |
| 572325 | 5/1993 | European Pat. Off. | H04N 1/40 |
| 3723438 | 7/1987 | Germany | H04N 1/40 |
| 832812 | 2/1996 | Japan. | |

OTHER PUBLICATIONS

Tsujimoto, et al., "Understanding Multi-articled Documents," 10th Int'l Conf. on Pattern Recognition, IEEE, vol. 1, Jun. 16–21, 1990, pp. 551–556.

*Primary Examiner*—Kimberly A. Williams
*Attorney, Agent, or Firm*—Fitzpatrick, Cella, Harper & Scinto

[57] ABSTRACT

A document image capture method and scanner, and an image processing apparatus incorporating such a scanner, in which a document is scanned two or more times. The first scan preferably provides bi-level image data, which is analyzed to identify blocks of uniform image type (for example, text, line drawing, grayscale image, or full-color image) within the document. The second scan, preferably performed at lower resolution than the first, provides grayscale or color information, which is substituted in the grayscale or color blocks, respectively, for the bi-level information obtained in the first scan. A third scan, to provide information of the third type, may also be performed. An operator preferably views an image of the document, based on the scanned information, to be sure that the identification and typing of the various blocks has been done correctly, and may instruct that the document be rescanned to provide new data for a designated portion of the document image, if it appears that an error has occurred. The information representing the document image obtained in this way is preferably stored using a set of linked bit maps, one bit map for each block. The memory capacity needed to store the information can be reduced further by treating the page and its margins as a frame, and by storing information about the frame, and any horizontal or vertical lines in the document, in simple vector form. Any portion of the document which is just background is not stored.

46 Claims, 17 Drawing Sheets

U.S. PATENT DOCUMENTS

| | | | |
|---|---|---|---|
| 5,121,445 | 6/1992 | Tsujiuchi et al. | 382/43 |
| 5,134,666 | 7/1992 | Imao et al. | 382/9 |
| 5,140,411 | 8/1992 | Haneda et al. | 358/75 |
| 5,151,949 | 9/1992 | Miyata | 382/9 |
| 5,155,589 | 10/1992 | Gere | 358/455 |
| 5,157,740 | 10/1992 | Klein et al. | 382/51 |
| 5,177,603 | 1/1993 | Kojima | 358/518 |
| 5,185,820 | 2/1993 | Miyata | 382/56 |
| 5,200,993 | 4/1993 | Wheeler et al. | 358/442 |
| 5,202,934 | 4/1993 | Miyakawa et al. | 382/41 |
| 5,278,918 | 1/1994 | Bernzott et al. | 382/176 |
| 5,301,244 | 4/1994 | Parulski | 358/512 |
| 5,335,290 | 8/1994 | Cullen et al. | 382/176 |
| 5,355,234 | 10/1994 | Kim | 358/512 |
| 5,587,808 | 12/1996 | Hagihara et al. | 382/176 |
| 5,588,072 | 12/1996 | Wang | 382/176 |
| 5,633,730 | 5/1997 | Sawada et al. | 382/176 |

Canon

Canon Information Systems, Inc.
Technical Information Center Newsletter
Published by Joyce Peluso
April 27, 1992, Volume 2, No. 4-4

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:

(1) Purely capitalistic enterprises that exploit their workers for profit.
(2) Those where management and labor work closely together to maximize profits, but don't pay enough attention to the community
(3) A company that both tries to make money but also seeks to fulfill its corporate responsibilities to society, but in a small scale way to a particular country or region.
(4) A highly evolved type of company that contributes positively to world prosperity.

Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Color Ink Jet Printer Sales
Source: BIS Strategic Decisions
(thousands of units)

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.

Mr. Takemoto wants to create a new Canon corporate culture, "The best of American and Japanese cultures must be blended to produce a richer corporate alchemy--a new ideal."

Canon wants to create more jobs for Americans in the 1990s and to make them an integral part of the Canon family. Mr. Takemoto is further committed to cultivating local talent and moving local executives up through the ranks of Canon's highest corporate echelons.

Ink-Jet Printer Market Share
Source: Computer Reseller News/Info Corp

| Selected Ink-Jet printers | March | April | May | June |
|---|---|---|---|---|
| Apple Stylewriter | 17.5% | 26.7% | 41.5% | 31.5% |
| H-P | | | | |
| PaintJet | <1% | 2% | <1% | <1% |
| DeskJet 500 | 49% | 39% | 31.6% | 24.6% |
| DeskWriter | 31% | 27.3% | 20.4% | 14.9% |
| Canon | | | | |
| BJ10E | <1% | 3.4% | 4.3% | 7.9% |
| BJ300/330 | <1% | <1% | <1% | <1% |

FIG. 3

| | | | | | | | |
|---|---|---|---|---|---|---|---|
| DOCUMENT IDENTIFIER |||||||||
| DOCUMENT TYPE |||||||||
| REGION IDENTIFIER | REGION TYPE | ULC | LRC | RELATED REGIONS | REGION ATTRIBUTES |
| 1 | TITLE | <0, 0> | <5, 40> | --- | |
| 2 | TITLE | <6, 5> | <10, 45> | 3 | ROMAN 15 PT |
| 3 | TEXT | <12, 0> | <35, 50> | 2 | ROMAN 8 PT |
| 4 | TEXT | <36, 0> | <45, 50> | | ROMAN 8 PT |
| 5 | LINE ART | <46, 0> | <60, 50> | --- | |
| 6 | GRAYSCALE | <6, 55> | <40, 100> | --- | |
| 7 | TITLE | <42, 60> | <50,100> | 8 | ROMAN 15 PT |
| 8 | TEXT | <52, 55> | <55, 100> | 7 | ROMAN 8 PT |
| ... | ... | ... | ... | ... | ... |

FIG. 10

METHOD FOR CAPTURING A DOCUMENT IMAGE, A SCANNER USING THE METHOD AND A DOCUMENT IMAGE MANAGEMENT SYSTEM USING THE SCANNER

BACKGROUND OF THE INVENTION

1. Field of the Invention

The present invention relates to document image acquisition, and particularly to ensuring that the acquired image data will be of high quality and a resolution suitable for the content of the image, even if the image contains text together with halftone (grayscale levels) or color image, or both.

2. Description of the Related Art

As increasingly larger storage devices have become available, it has become possible to store a document not simply as ASCII text but also as a full facsimile image of the document. More specifically, it is now commonplace to convert a document into a computer-readable bit map image of the document and to store the bit map image. Accordingly, whereas ASCII text storage permitted storage and display of only text portions of documents, it is now possible to store a document in computer readable form and to display not only the text but also pictures, line art, graphs, tables and other non-text objects in the document, as well as to show the text in the actual font and style used in the original document. Likewise, it is possible to store and display documents such that text attributes, such as size, position, etc., are preserved.

FIG. 3 shows a page of a representative document. In FIG. 3, a document page 40 is arranged in a two-column format. The page includes title blocks 41, 42, 47 which include text information of large font size suitable for titles, text blocks 43, 44, 48, which include lines of text data, graphics blocks 45, 46 which include graphic images which are not text (in this example, they are a line drawing and a full-color image), a table block 49 which includes a table of text or numerical information, and a caption block 50 which includes small text data and which is a caption associated with blocks of graphic or tabular information.

Despite the technical advances mentioned above, however, it is still difficult to store document images in computer memory efficiently, because of the large amount of information required for even one page. For example, at 300 dots-per-inch resolution, an ordinary 8½ by 11 inch black and white document requires approximately 8.4 million bits to store a full document image (assuming that only one bit is used per dot, which is possible with monochrome text and line drawings, but not with images containing grayscale image or color image portions). Adding grayscale image or color to the document, or increasing the resolution at which the image is stored, can easily increase storage requirements to many tens of millions of bits per page. Moreover, the time required to retrieve those bits from storage and to create and display the resulting image is significant, even with current high speed computing equipment. The time is lengthened even further in situations where the document image is retrieved from storage in a first computer and electronically transmitted, by modem, for example, to a second computer for display on the second computer.

It has been conventional to scan a document combining black and white text with color image or grayscale image, or both, in a PC-based document management system using only a black and white (bi-level) scanner. Many disadvantages are attendant upon this approach, however.

First, scanning a color or grayscale image in black and white scanning mode not only loses all the hue information of a color original and the gradations in density of both color and grayscale images, but in many cases results in a mere conglomeration of black blobs. Text and line drawings scanned in a grayscale or color mode, on the other hand, become very blurry, and characters scanned in that fashion are not legible to optical character recognition processing ("OCR processing").

Moreover, even color scanning a grayscale image often produces unacceptable results. Although a color scanner should pick up the densities in a grayscale image well, inadequacies in the scanner may result in some "tint tainting" of the grayscale image data. That is, although the grayscale image is made up entirely of black, white and shades of gray and so has no chrominance or hue, the scanner may erroneously detect a slight hue in the grayscale image. This is because the color scanner cannot directly detect a gray value as such, but can only detect three predetermined primary colors, typically red, green and blue. When scanning an achromatic point, such as a point that is pure black, white or gray, the color scanner should detect exactly equal values for these three color components. In practice, however, slightly different values for the three color components may be detected, due to scanner inadequacies. Upon display or reproduction, the point will have a slight hue instead of being achromatic as it should be.

Thus, using one type of scanning for an entire document that includes color, grayscale or both, in addition to text, is not a viable approach.

Also, with document images (as opposed to text documents created locally in ASCII code using a word-processing program to begin with), it has been proposed to subject text portions of a document image to optical character recognition processing and to store the character information so obtained in ASCII form, greatly reducing the amount of storage required for the text portions. This technique, however, does not preserve any information regarding the type font used in the original document, and obviously is not applicable to non-textual portions of a document, or even to textual portions which are not in a font recognizable by the particular OCR process being employed.

The growing importance of desktop publishing in the business world only makes the problems described above more urgent. This technique has come to depend more and more heavily on scanning as a way to capture material, that is, of entering text, color images and grayscale images into a form usable in a desktop publishing system.

SUMMARY OF THE INVENTION

It is one object of the present invention to provide an apparatus and method for processing a document so as to capture or acquire the contents of the document and to store those contents for future retrieval, with reduced memory capacity requirements.

It is another object of the invention to provide an apparatus and method for processing a document to capture and store the document contents in such a manner as will permit convenient and quick retrieval of the document for display or other processing at a later time.

It is still another object of the invention to provide an apparatus and method for processing a document to capture the document contents in such a manner that text, line drawing, grayscale and color portions are each treated in a way suitable for each of these image types, and such as to prevent degradation in image quality resulting from the processing and storage of the information.

It is yet another object of the invention to provide a single-board document scanner which meets the foregoing objects, and a document image management system using such a scanner.

It is another object of the invention to provide a method and apparatus, and in particular a scanner, which meet the foregoing objects and are suitable for use in connection with, or as part of, a desktop publishing system.

In a first aspect, the foregoing objects are achieved by providing an image scanning method and apparatus, which may be either an individual scanner by itself or a more elaborate apparatus or document image management system including the scanner, using first and second sensors, and a control system, and in which the control system effects a first scan of an image, using the first sensor, and then a second scan, using the second sensor.

In another aspect, the foregoing objects are achieved by providing an image scanning method and apparatus, which may be either an individual scanner by itself or a more elaborate apparatus or document image management system including the scanner, using a sensor system, which may be either one or plural sensors, and a control system, and in which the control system effects plural successive scans of an image, to provide successively a combination bi-level, grayscale and color data as needed.

In another aspect, the foregoing objects are achieved by providing a scanning method and scanner or larger apparatus including such scanner, using first and second sensors, a detector which detects image type based on the image data itself, and a control system. In this aspect of the invention, the control system causes a first scan of the image to be carried out using the first sensor, and then a second scan, responsive to detection that image content of a particular type is present in the image. The second scan is carried out using the second sensor.

In another aspect of the invention, these objects are achieved by providing a method and a scanner and an apparatus or system incorporating the scanner, using first and second sensors, a memory and an analysis and control system. In this aspect of the invention, the analysis and control system itself detects image type based on image data obtained using the first sensor.

Upon detection of image content of a particular type in at least one portion of the document, the image is scanned using the second sensor. Additionally, the information obtained from the first scan is stored in the memory, after which information from the second scan is stored in the memory, only for those portions of the image identified as being of the particular image type.

According to another aspect of the invention, these objects are achieved by providing a method and scanner and a system and apparatus incorporating such scanner, using first and second sensors, a display and a control system, in which information obtained by scanning the image using the first sensor is displayed, after which a second scan is performed using the second sensor, responsive to entry of an instruction by an operator for such second scan.

In another aspect of the invention, the foregoing objects are achieved by providing a method and a scanner and an apparatus and system incorporating the scanner, using first and second sensors, and an analysis and control system in which image information obtained from a first scan of the document using the first sensor is analyzed to identify portions of the image as having various image types. Also, according to this aspect of the invention, a determination is made that image content of first and second types is present in at least first and second respective portions of the document, and a second scan is performed, in which the second sensor is used. In addition, in this aspect of the invention, the information obtained in the first scan is initially displayed, and after the second scan, information from that scan is used in the display, but only for those portions of the image identified as being of the second image type.

According to still another aspect of the invention, these objects are achieved by providing a method and a scanner and an apparatus system incorporating the scanner, using first and second sensors, a memory and an analysis and control system, in which data obtained by scanning the image with the first sensor is used to identify portions of the image as being of various image types. A second scan is performed, using the second sensor, responsive to a determination that image content of a particular type is present in at least one portion of the document. Moreover, image data obtained by the first sensor is stored in the memory initially, and thereafter information obtained by the second sensor is stored in the memory, only for those portions of the image identified as being of the particular image type. According to this aspect of the invention, the image data stored in the memory in the form of respective bit maps for respective portions of the image, and those bit maps are linked in the memory.

According to still another aspect of the invention, these objects are achieved by provision of a method and a scanner, and of an apparatus and system including the scanner, using a color sensor, a memory and an analysis and control system, in which a scan of the image is performed using the color sensor, after which, responsive to detection that the image contains grayscale image in at least one portion, the color image data obtained for that portion is converted to grayscale data. Also, according to this aspect of the invention, information obtained by the color sensor is stored in the memory for non-grayscale portions of the image while the grayscale image data is stored for those portions identified as being grayscale image.

According to another aspect of the invention, the foregoing objects are achieved by providing a method and a scanner and apparatus or system incorporating the scanner, in which portions of a document are identified as being of respective image types, and image data representing the document is stored in a memory, and in which the image data is organized in a set of linked bit maps each containing information of only one image type and pertaining to only one of the identified portions of the document.

These and other objects, features and advantages of the invention will be more fully understood from the following detailed description of the preferred embodiments, taken in conjunction with the accompanying drawings. In the drawings, it is to be understood that like elements are indicated by like reference characters.

BRIEF DESCRIPTION OF THE DRAWINGS

FIG. 3 is an example of a page containing a mixture of text and color image.

FIG. 10 is an illustration of block information derived from the scanning of the page shown in FIG. 3.

DETAILED DESCRIPTION OF THE PREFERRED EMBODIMENTS

Figure 1:
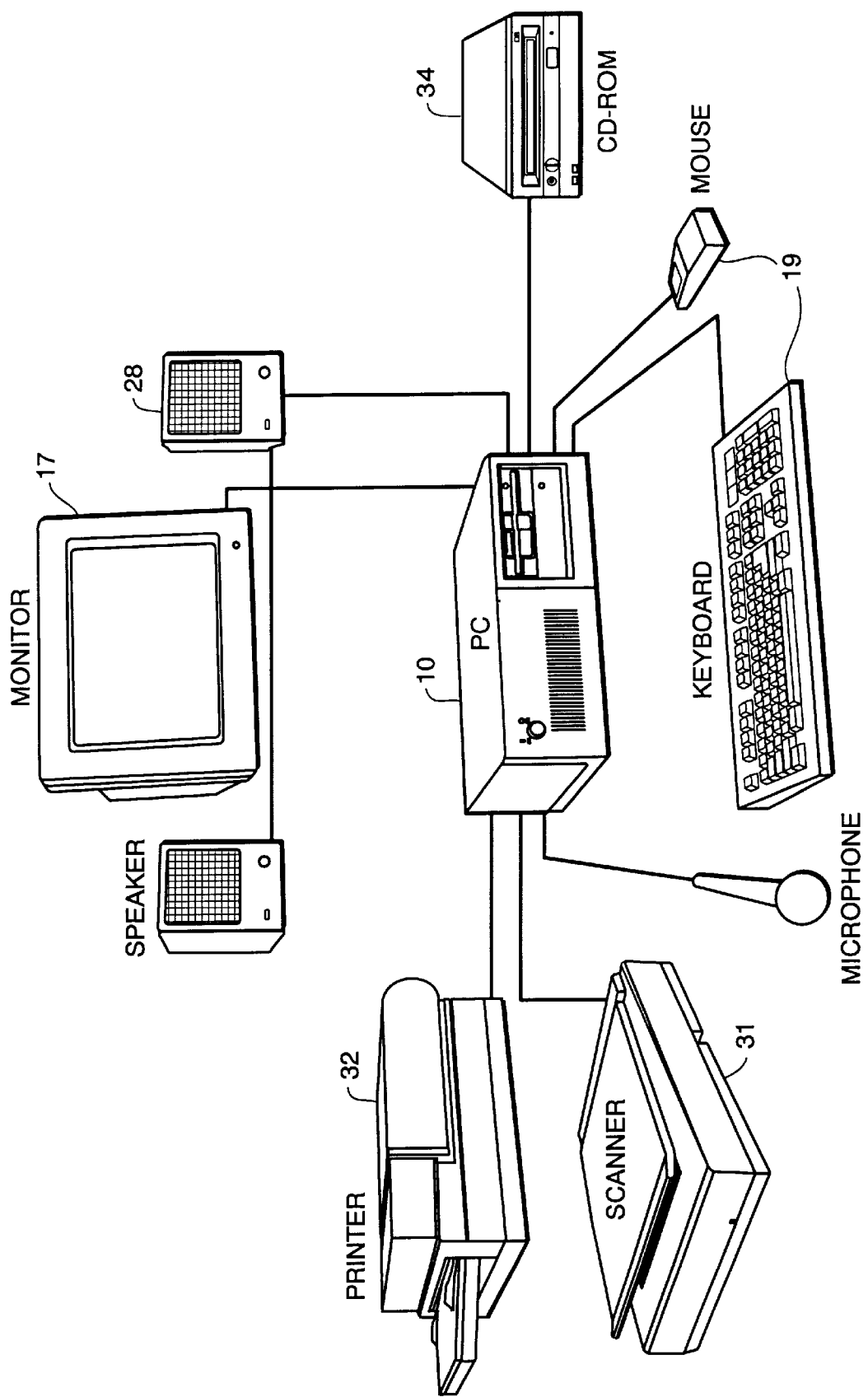
FIG. 1 is a perspective view of an apparatus, incorporating a scanner, according to the present invention.
Figure 2:
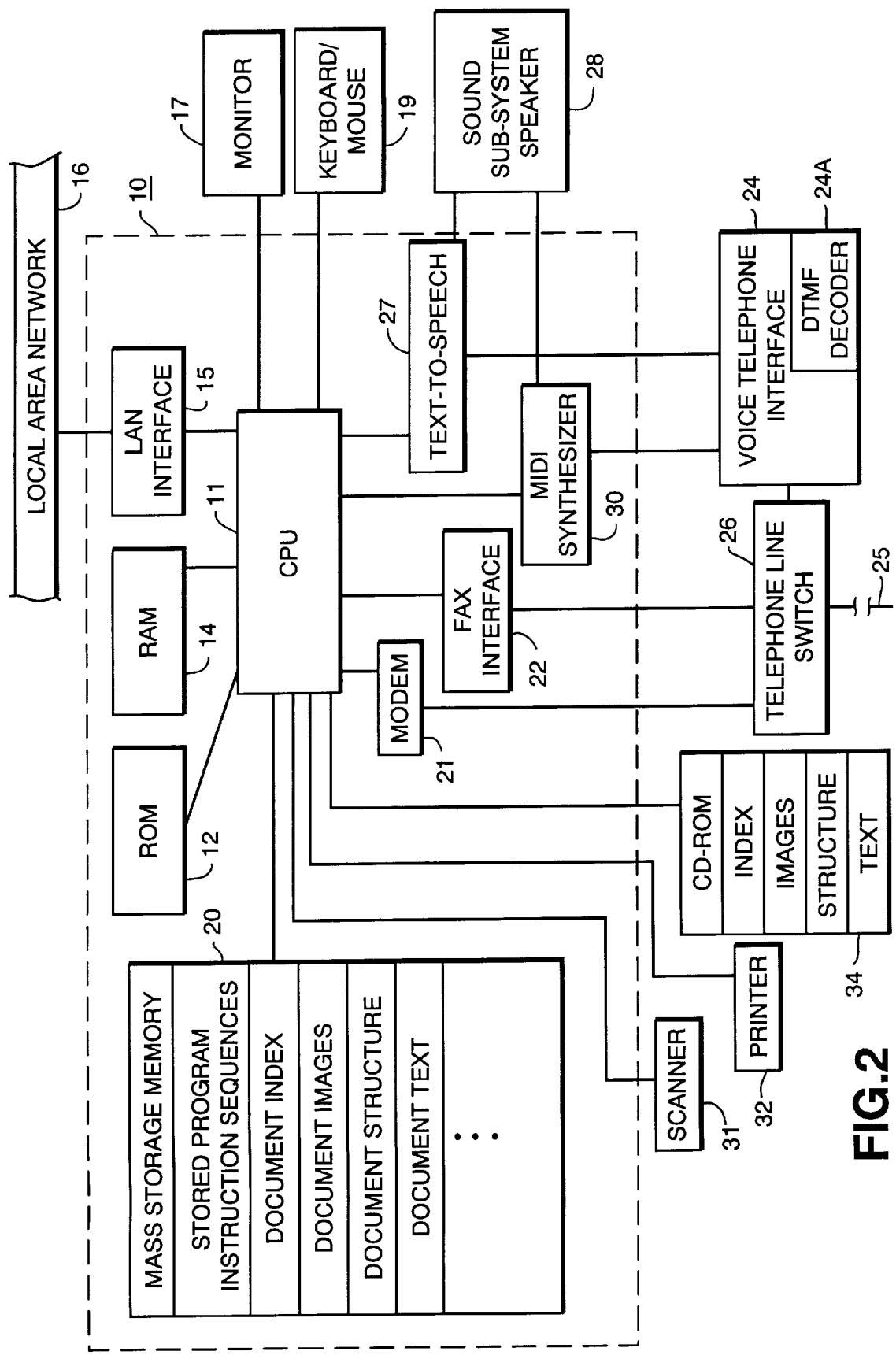
FIG. 2 is a block diagram showing schematically the construction of the apparatus of FIG. 1.

FIGS. 1 and 2 show an apparatus according to the present invention, specifically, a document image management system.

As shown in these figures, reference numeral 10 designates personal computing equipment such as an IBM PC or PC-compatible computer. Computing equipment includes a CPU 11 such as an 80386 or 80486 processor (or any other sufficiently powerful processor) which executes stored program instructions such as operator selected applications programs that are stored in ROM 12 or specialized functions such as start-up programs or BIOS which are stored in RAM 14. Computing equipment 10 further includes a local area network interface 15 which provides interface to a local area network 16 whereby the computing equipment 10 can access files such as document files on a remote file server, send files for remote printing, have remote machines access document images on equipment 10, or otherwise interact with a local area network in accordance with known techniques such as by file exchange or by sending or receiving electronic mail.

Computing equipment 10 further includes a monitor 17 for displaying graphic images and a keyboard/mouse 19 for allowing operator designation of areas on monitor 17 and inputting information.

Mass storage memory 20, such as a fixed disk or a floppy disk drive, is connected for access by CPU 11. Mass storage 20 typically includes stored program instruction sequences such as an instruction sequence for indexing, retrieving and displaying documents, as well as other stored program instruction sequences for executing application programs such as word processing application programs, optical character recognition programs, block selection applications programs, spreadsheet application programs, and other information and data processing programs. Mass storage memory 20 as shown further includes document index tables which contain index information by which documents can be retrieved, as well as bit map images of documents, document structures, and ASCII text for text areas of the documents. Other data may be stored in mass storage memory 20 as desired by the operator.

A modem 21, a facsimile interface 22, and a voice telephone interface 24 are provided so that CPU 11 can interface to an ordinary telephone line 25. The modem 21, facsimile interface 22, and voice telephone interface 24 are each given access to the telephone line 25 via a telephone line switch 26 which is activated under control by CPU 11 so as to connect telephone line 25 to the modem 21, the facsimile 22, or the voice telephone interface 24, as appropriate to the data being sent and received on the telephone line. Thus, CPU 11 can send and receive binary data such as ASCII text files or document image files via modem 21. The CPU 11 can be controlled by a remote computer via modem 21, it can send and receive facsimile messages via facsimile interface 22, and it can interact on an ordinary voice telephone line via voice telephone interface 24. In this regard, voice telephone interface 24 is provided with a DTMF decoder 24A so as to decode tones on the voice telephone line 25 which correspond to operator depressions of keys on a telephone keypad. In accordance with stored program instruction sequences in mass storage memory 20, the decoded tones are interpreted by CPU 11 into operator commands, and those operator commands are executed so that predesignated actions are taken in accordance with operator depressions of the telephone keypad keys.

A conventional text-to-speech convertor 27 is connected to the CPU 11. The text-to-speech convertor 27 interprets text strings that are sent to it and converts those text strings to audio speech information. The text-to-speech convertor 27 provides audio speech information either to speakers 28 for enunciation to a local computer operator, or provides audio speech information to the voice telephone interface 24 for enunciation over ordinary voice telephone lines.

MIDI ("Musical Instrument Digital Interface") synthesizer 30 is also connected to CPU 11 and interprets MIDI music commands from CPU 11 so as to convert those MIDI music commands to audio wave forms. The audio wave forms are, in turn, played out over speakers 28 or provided to voice telephone interface 24 for play out over ordinary voice telephone lines.

Scanner 31 operates to scan original documents printed on paper sheets or other recording media, and to convert the information contained in those original documents into a bit-by-bit computer readable representation of each such document. Scanner 31 has black and white (bi-level) scanning capability, but also includes grayscale processing capabilities or color processing capabilities, or both, as described below.

Printer 32 is provided to form images of documents under the control of CPU 11. Printer 32 may be an ordinary black and white printer, but, more preferably, printer 32 includes color and/or grayscale printing capabilities.

A CD-ROM 34, such as an optical disk, is connected for access by CPU 11. The CD-ROM 34 operates to supplement the storage in mass storage memory 20 and contains additional information concerning document images, document indexes and document structure. It is also possible to provide a write-once-read-many ("WORM") optical device or an ordinary read/write optical device so as to further supplement the storage capabilities of the apparatus. In addition, via the local area network 16, CPU 11 can access document indexes, document images and document structure stored at remote file server locations, and via modem 21, CPU 11 can access document indexes and document images stored at centralized data base locations over ordinary voice telephone lines.

FIG. 3, mentioned above, is an illustration of what a typical page of an input document might look like. As shown in FIG. 3, it is common for such a page to include text portions (not necessarily all in the same style of font or of the same size of type), as well as graphs or other line drawings, grayscale images (i.e., black and white or other monochrome images in which gradations between pure black and pure white are expressed), and full-color images may be present. In the example shown in FIG. 3, several areas of text are present, including different fonts and print sizes, as well as a color photograph (indicated in the illustration in black and white) and a line drawing (in this instance, a line graph).

The operator whose task it is to input the document of FIG. 3 into a document image management system database using the equipment shown in FIG. 1, performs this job as follows. First, the document is placed on the scanner 31, and is scanned by that unit. The information obtained in this manner is displayed on the monitor 17 for review by the operator, and, if dissatisfied with the manner in which the system has input the information, the operator can designate particular areas of the document to be reprocessed. When the operator is satisfied with the information acquired in this manner, the information is stored, for example, in the mass storage memory 20.

Figure 4:
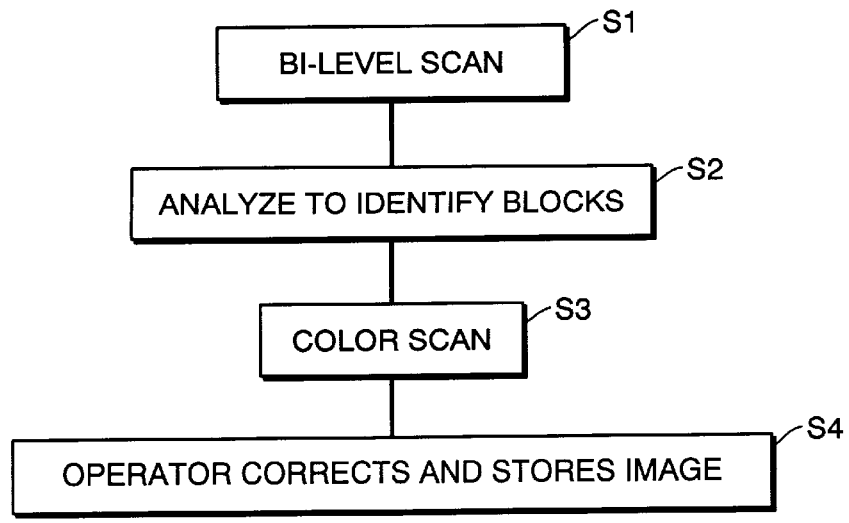
FIG. 4 is a flow chart illustrating the overall operation of the system of FIG. 1 to scan a document.

This basic process is illustrated in the flow chart of FIG. 4. In step S1, the operator places the document in the scanner 31 and instructs the scanner to commence operation. This may be done by pressing a button on the scanner itself, or by entering a command via the mouse or the keyboard. The scanner reads the entire surface of the document with light from a light source, either by scanning the surface with the light beam or by moving the document past a stationary reading position illuminated by the light source. The light reflected from the document varies in intensity in accordance with the image content of the particular point on the image from which it has been reflected. In a black and white (bi-level) portion of a document, for instance, the reflected light will have one of two intensities, depending on whether the particular point on the document is black or white. When scanned on a grayscale portion, the reflected light beam intensity will vary between those two extreme values, according to the density of the scanned point. In a color portion, a white light beam from the light source will contain three primary-color components (e.g., red, green and blue), the intensity of each of which will vary depending on the density of the corresponding primary-color component at the point in question on the document. Thus, the reflected light beam conveys information, in the form of intensity variations, from which the scanner determines document image information, pixel by pixel.

This information is output from the scanner 31 in the form of a digital signal representing information as bi-level information for each pixel. That is, for each pixel, a single bit indicates whether the scanner has evaluated the pixel as black or as white. The scanner 31 converts this information, which is gathered at relatively high density (for example, 200 dots per inch) into information of a resolution suitable for display on the monitor 17 (for example, 60 or 80 dots per inch). This information is then displayed on the monitor 17, preferably at such a size that half of a page or more is visible on the monitor at once.

In step S2, the scanner 31 analyzes the bi-level information to identify various blocks of features on the document. For example, the algorithm used for this purpose will identify the blocks indicated in FIG. 3. The scanner 31 also analyzes the contents of each block to determine whether each block is text (which can suitably be handled as bi-level information), like block 43, or whether it is grayscale or color information (both requiring several bits per pixel for proper representation), like block 46. Once the location, size, shape and type of each block have been determined in this manner, the monitor 17 displays the information taken from the document itself, and preferably also displays an indication of the block boundaries and perhaps of the nature of each block.

In the bi-level scanning step S1, the information is first scanned to produce bi-level information, that is, one bit for each pixel. For text and (black and white) line graphics, this is an appropriate scanning method, and the data obtained in this fashion will be suitable for storage and subsequent processing. The grayscale and color areas, however, cannot be properly represented by bi-level information without great loss of image content and quality. Therefore, after the initial scan to produce bi-level information, the scanner 31 performs a second scan, in step S3, to obtain color information from the document. For each pixel, the information obtained in this scan includes a multi-bit datum for each of three primary colors, for example, 8 bits each for red, green and blue color components. The color information obtained in the color scan is substituted for the corresponding bi-level information for those pixels lying in areas identified as color or grayscale image, and this substitution is displayed on the monitor 17 as well.

The operator reviews what is displayed on the monitor 17 as a result of these scans. If there are any overlapping blocks resulting from the analysis algorithm, of if any regions appear to have been misclassified, such problematic areas can be designated by the operator, in step S4, using mouse or keyboard controls 19, for example, and the operator instructs that each designated area be reprocessed, typically by rescanning (other possibilities are explained below). In this case, the operator also designates what type of scan should be performed for the designated area (color or bi-level). The information obtained from this new scan is substituted for that previously present in the designated area.

Once the displayed area meets with the operator's approval, the operator reviews the rest of the page (if any) and, when that also is satisfactory, enters a "store" instruction. The information for the document is then sent by the scanner to the CPU 11 for storage, in mass storage memory 20 or in CD-ROM 34.

Alternatively, the information can be sent to a remote location via the local area network 16, or via the fax interface 22 and telephone line switch 26.

In the preferred embodiments, the information for the page is stored by means of respective bit maps for the different blocks, and these bit maps are linked to each other by an appropriate set of pointers, to form a single image file. This approach can be easily accommodated using the TIFF standard. Other manners of storage, however, are also contemplated, and ordinary DIB storage, for example, may be used.

Figure 5:
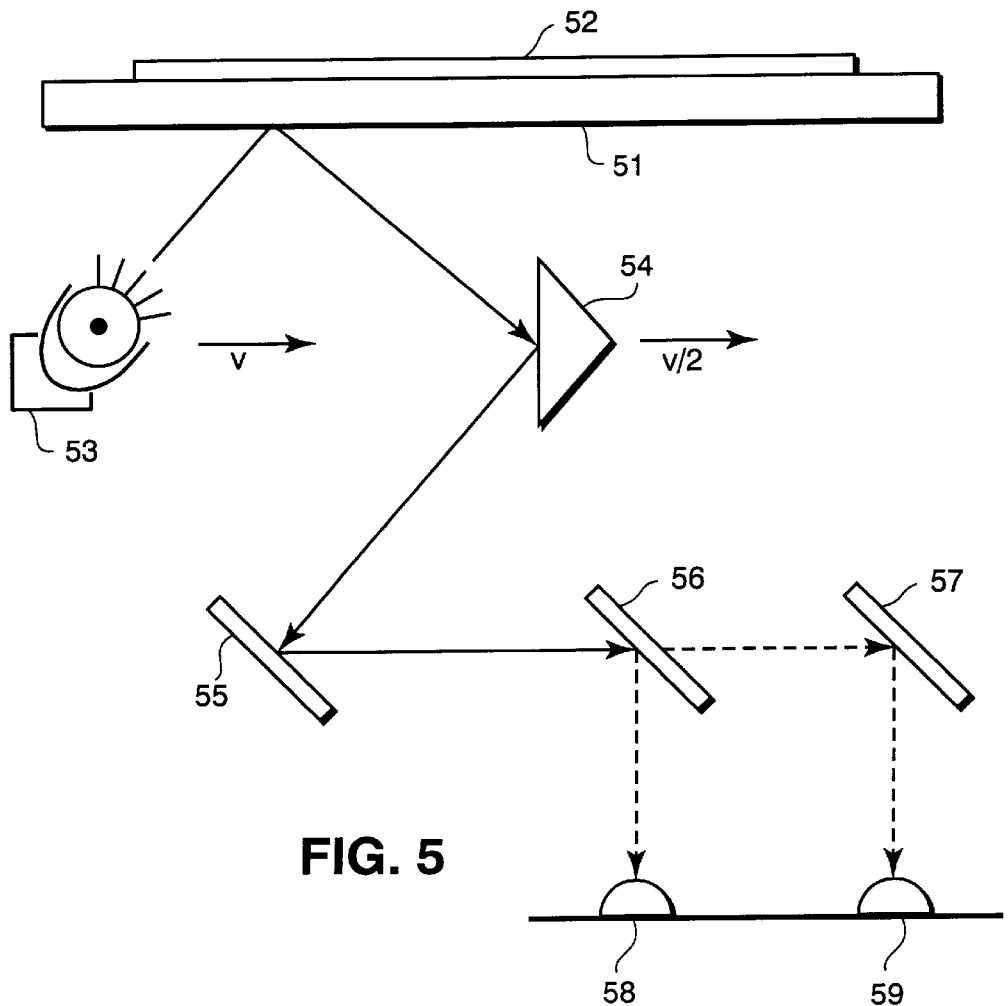
FIG. 5 is a schematic view of the scanner shown in FIG. 1.

FIG. 5 is a partial cross-sectional view of a scanner according to the first embodiment of the invention. As shown in this Figure, the scanner is provided with a transparent platen 51 on which the document 52 is placed face down. The platen 51 and document 52 are illuminated from below by a light source 53, which is typically a halogen lamp, for example. The light source 53 illuminates the full width of the document, preferably, and a scan of the entire document is performed by effecting relative motion between the document 52, and the light source 53. While this can be done by moving the platen 51 with the document resting on it, past the light source 53, it is also possible to scan by holding the platen 51 stationary while the light source 53 is moved. In the latter approach, which is adopted in the embodiment of FIG. 5, the light source 53 is moved parallel to the underside of the platen 51 at a speed v, and a first mirror 54 is traversed parallel to the light source 53, but at a speed v/2. The traversing mirror 54 is oriented to receive the light reflected from the portion of the document which is most brightly irradiated, and directs that light to a second mirror 55, which in turn reflects the light to two further mirrors 56 and 57, one of which (mirror 56) is movable, and which cause the light to impinge on one or the other of two parallel light sensors 58 and 59, respectively.

In this embodiment, both light sensors 58 and 59 are linear (one-dimensional) arrays of CCD elements, which are well known in the art. Depending on the orientation of the movable mirror 56, the light either proceeds directly to the first CCD sensor 58, or, if mirror 56 is retracted from the path of the light, to the second CCD sensor 59. The first sensor 58 is divided into relatively small pixels, to provide information having a high resolution, preferably at least 200 dots per inch. This sensor provides the bi-level information. The pixels of the second CCD sensor 59 are larger than those of the first, providing a lower-resolution output. In order to output color information, each pixel of the second sensor 59 is covered with a color filter (not shown) that is either red, green or blue. Light which reaches any of the pixels in this sensor does so only after passing through one of these color filters, and thus provides information relating to one of these three primary-color components. The filters of these three colors are arranged in an alternating pattern, in a manner well known to those in the art, so that each group of three adjacent pixels of the second sensor 59 includes one pixel each to receive red, green and blue light. In this manner, by directing the light reflected from the document to a particular one of the CCD sensors, the scanner obtains either bi-level or color image information.

It will be appreciated that movable mirror 56 can be replaced with a half mirror or other similar beam-splitter, although the resulting arrangement has the disadvantage that each sensor will receive a less-intense irradiation than in the arrangement described above.

In each sensor 58 and 59, the radiation impinging on each pixel causes the formation of charges in that pixel. After a predetermined length of time sufficient to accumulate a readable amount of charge, the accumulated charges are read out from the sensor. Preferably this is done by reading out the charges from all the pixels of the sensor in parallel, to an analog shift register (not shown), from which they are then shifted out in series. The resulting charges are read out as currents proportional to the amount of accumulated charge, which can be (and generally are) converted to a voltage signal by conventional circuitry. The voltage signal, which is still in analog form, is then converted to digital form.

In this manner, the information from the bi-level CCD sensor 58 becomes a simple binary bit stream, with one bit of information for each pixel. The color data, in contrast, is digitized in such fashion as to produce several bits per pixel. Typically, eight bits will suffice for each color component for each pixel in the color information.

A page memory 61, sufficient to hold the bi-level information for an entire page of predetermined size, is provided (see FIG. 6), and stores the bi-level information for the entire document. In this embodiment, page memories 62R, 62G and 62B are also provided for the color data. It will be appreciated that the page memory for each color component of the color data is several times as large as that for the bi-level data, since several times as many bits per pixel are required.

Document Capture in the First Embodiment

When the operator places a document 52 on the platen 51 and enters an instruction to commence scanning (this instruction may be entered either through the keyboard or mouse 19 shown in FIG. 2, or directly by means of a button or the like provided for this purpose in the scanner 31), movable mirror 56 is positioned in such manner as to cause light reflected from the underside of the document to go to the first CCD sensor 58. After one line of data is read by the sensor 58, the line of data is read out from the sensor as described above and stored in the page memory 61 for bi-level data. The document is read in this way one scan line at a time, until the entire document has been scanned and the resulting data bi-level has been stored in the page memory 61. This information is copied, in the illustrated embodiment, into a document image page memory 63, for a purpose described below.

Figure 8:
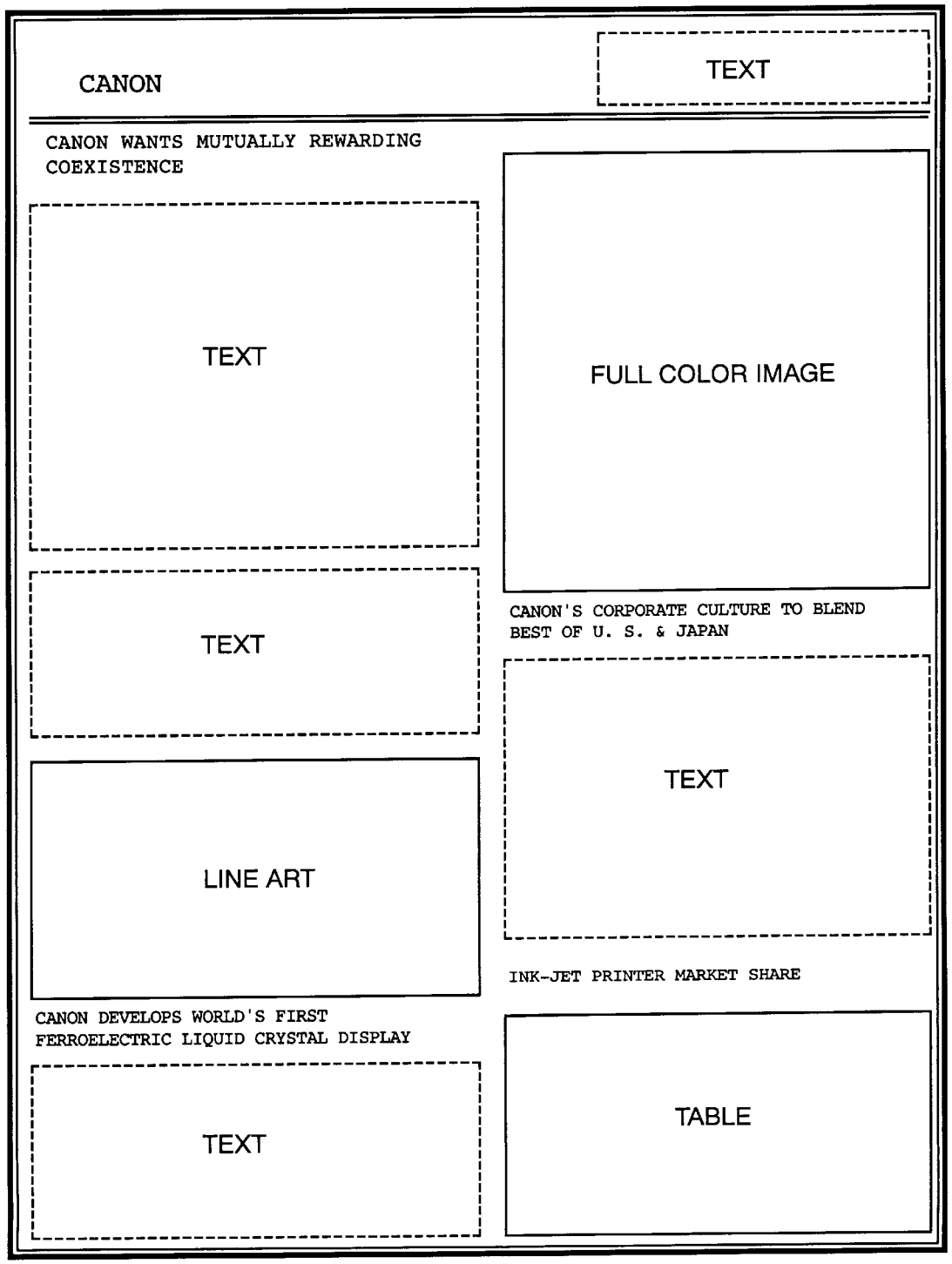
FIG. 8 is a view of the page shown in FIG. 3, as analyzed during scanning by the scanner of FIG. 5.

The scanner CPU 64 now processes this information to identify blocks of common image type in the page. That is, the page image is analyzed by the scanner to identify regions, preferably rectangular, containing all text, all full-color or grayscale image, etc. This analysis is carried out using an algorithm devised by one of the present inventors, and disclosed in detail in commonly-assigned application Ser. No. 07/873,012, now U.S. Pat. No. 5,680,479, the disclosure of which is hereby incorporated herein by reference. Of course, any other algorithm which will perform the desired analysis may be used instead, but the mentioned one is the preferred manner for carrying out this part of the invention. The blocks which result are illustrated in FIG. 8.

Figure 7A:
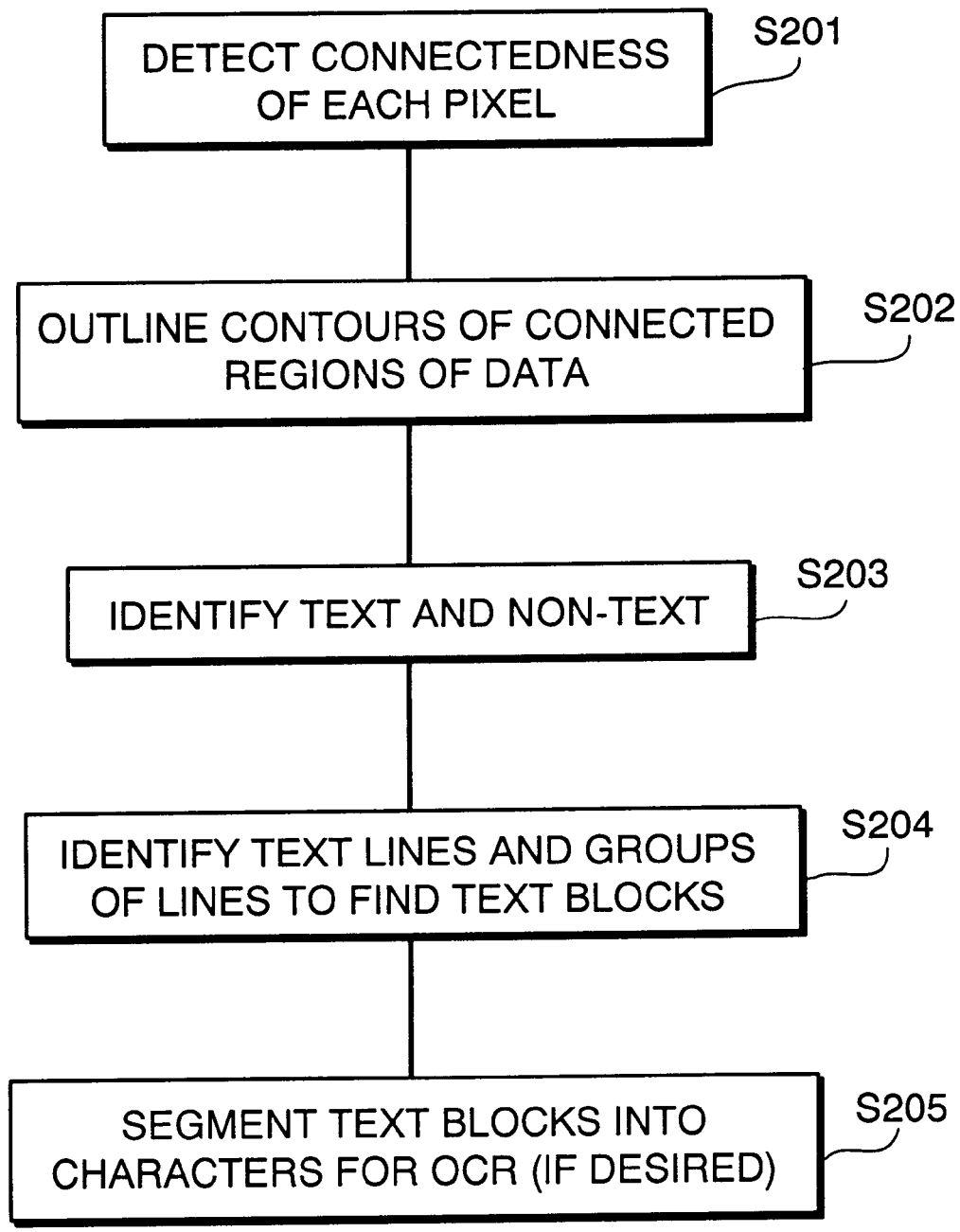
FIGS. 7A through 7C are flow charts illustrating in more detail the operation of the scanner of FIG. 5 to carry out the process of FIG. 4.

In the preferred algorithm, briefly, blocks of pixel image data are identified, or selected, by checking each pixel to see which adjacent pixels have the same bi-level value (step S201 in FIG. 7A). This indicates (usually small) regions each made up of connected black pixels. Then, contours of such connected components in the pixel image data are outlined (step S202). For each such group, a determination is made as to whether the outlined connected components include text or non-text units, based on the size of the outlined connected components (step S203). Text units are then connected selectively, widthwise, to form text lines based on proximity of adjacent text units, and the resulting text lines are then selectively connected vertically to form text blocks, also based on proximity of adjacent text lines and on the presence or absence of non-text units between text lines (step S204).

Text blocks are segmented into text lines of pixel data by dividing the blocks into columns (although in some cases no such division is necessary), based on the horizontal projection of pixel density across the column, and characters are then cut from the segmented lines (step S205). The cut characters can then be subjected to OCR, and character codes for each can be derived based on such recognition processing.

The monitor 17 then is caused to display an image of the page. The image data actually used to control the display is arranged in the video memory VMEM 65, which under the control of the scanner CPU 64 is supplied with information for display from the document image page memory 63.

In practice, most monitors are not large enough to display an entire page at a legible resolution. Accordingly, it is contemplated that a portion of a page, preferably at least one-half of the page, will be displayed at one time. In any event, this display will be at a resolution considerably below that with which the image was scanned by the bi-level scanner 58, because most monitors cannot display at 200 dpi. Once the necessary change in resolution is effected, for example to 60 or 80 dots per inch, the resulting lower-resolution bi-level data is supplied to the video memory 65 and the monitor 17 and displayed. Preferably, data is added to this lower-resolution bi-level data, to show the outlines of the blocks identified by the above-mentioned algorithm along with, preferably, an indication in each as to what type of image content has been identified as residing within the block. This identification can be by means of a predetermined symbol, or the outline of each region can be indicated in a different manner depending on image content (for example, a dashed line around text and line-drawing content, versus a dotted line or the like around portions of color or grayscale data).

Figure 7B:
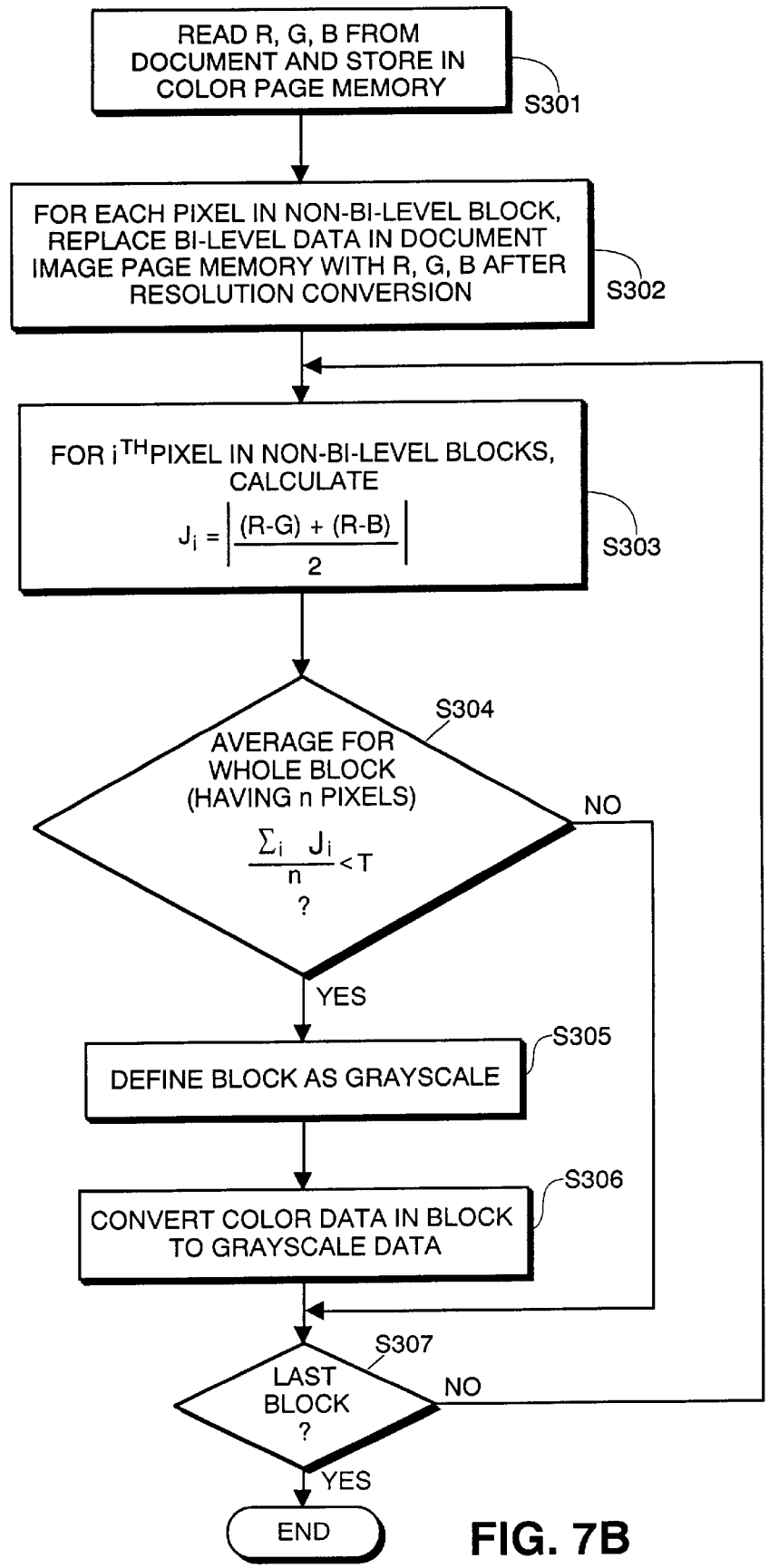

While the analysis of the bi-level data is being performed as described above, the scanner 31 moves mirror 56 so as to direct the light from the document to the color sensor 59. The document is now scanned a second time to obtain color information (step S301 in FIG. 7B), which is provided one line at a time by the color sensor 59 to the color page memory 62, in the same manner as was done with the bi-level information. For each pixel, the three eight-bit signals representing the three color component values for that point are supplied from the sensor 59 in series, to the color information page memory 62, where the three eight-bit signals are respectively stored in the red, green and blue portions 62R, 62G and 62B of that memory.

For each area identified as being color/grayscale in the page, the bi-level information obtained in the first scan and stored in the document image page memory 63 is replaced with the corresponding color information obtained in the second scan (step S302). The information in the video memory 65, and so the display, is also updated to show this color information. Thus, as the color information is received, the color/grayscale areas are displayed on the basis of the color information obtained in the second scan.

It should be noted that in this embodiment the color scan is performed at a lower resolution than the bi-level scan, for example, at 60–80 dots per inch. This difference in resolution is not essential, but reduces the memory capacity requirements. The present invention is not, of course, limited to use of a color scan at a lower resolution than the bi-level scan. In some applications, involving high-quality image reproduction, it may in fact be preferable to perform the color scan at the same resolution as the bi-level scan, or even at a higher one.

If performed at a lower resolution than the bi-level scan, as in the present embodiment, the color scan may yield data very close to the proper resolution for the monitor 17, and if the two resolutions are the same, it will be appreciated that no resolution conversion has to be performed on the color data to effect display thereof.

The scanner 31 now performs a second analysis, to determine which if any of the color/grayscale areas are actually a grayscale rather than color image, and then converts the image data obtained for those areas in the second scan, to true grayscale information.

To identify the true grayscale regions, the scanner CPU 64 executes the following steps. For each pixel in a block which has been identified as color/grayscale, the scanner 31 compares the three color-component values obtained for the pixel. In grayscale image, those three values should ideally be identical and in practice will not be very different from one another. If the scanner determines that the pixels in such block all meet this criterion, i.e., have their R, G and B values either identical or within some predetermined range of each other, the scanner decides that the block is grayscale rather than color. This is shown in step S303, where the scanner subtracts both the green and the blue values G, B for the pixel from the red value R, and takes the average of the two differences. The scanner then takes the absolute value of this average $J_i$, and, in step S304, divides the sum of these values for all the pixels in the block by the number n of those pixels. This number is then compared to a threshold value T. If the average is less than T, the scanner decides that the block contains grayscale rather than color image (step S305). T preferably can be set by the operator, either by means of a special control provided on the scanner 31 itself for this purpose or through the keyboard or mouse 19 of the document image management apparatus shown in FIG. 2. A value of 8 is thought to be appropriate in most cases (assuming eight bits per pixel per color component, as in the present embodiment).

If the block is thus found to be grayscale, the scanner CPU 64 then converts the color data for the pixels in this block to grayscale information (step S306), and the processing is repeated for any additional color/grayscale blocks in the document image page memory 63.

Figure 9:
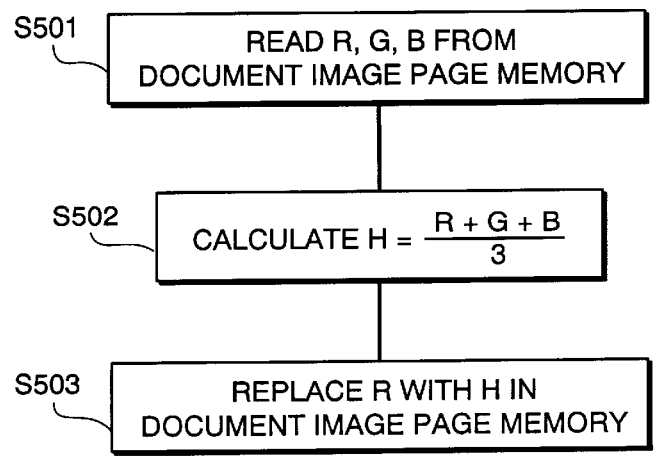
FIG. 9 is a flow chart illustrating the conversion of color image information into grayscale information in the first embodiment.

The conversion of the color to true grayscale information is performed as follows. The scanner reads the color component data R, G and B and takes the arithmetic average H of those data for the first pixel in the block (steps S501 and S502 in FIG. 9). This average H is assigned in place of the R, G and B values for the pixel in the document image page memory 63 in place of the previous values scanned. Thus, H serves as a grayscale data value for that pixel, representing a shade of gray, or white or black. This conversion eliminates any slight tinting of the image for the grayscale and that may have been present in the color data due to peculiarities or irregularities in the color sensor 59.

Figure 7C:
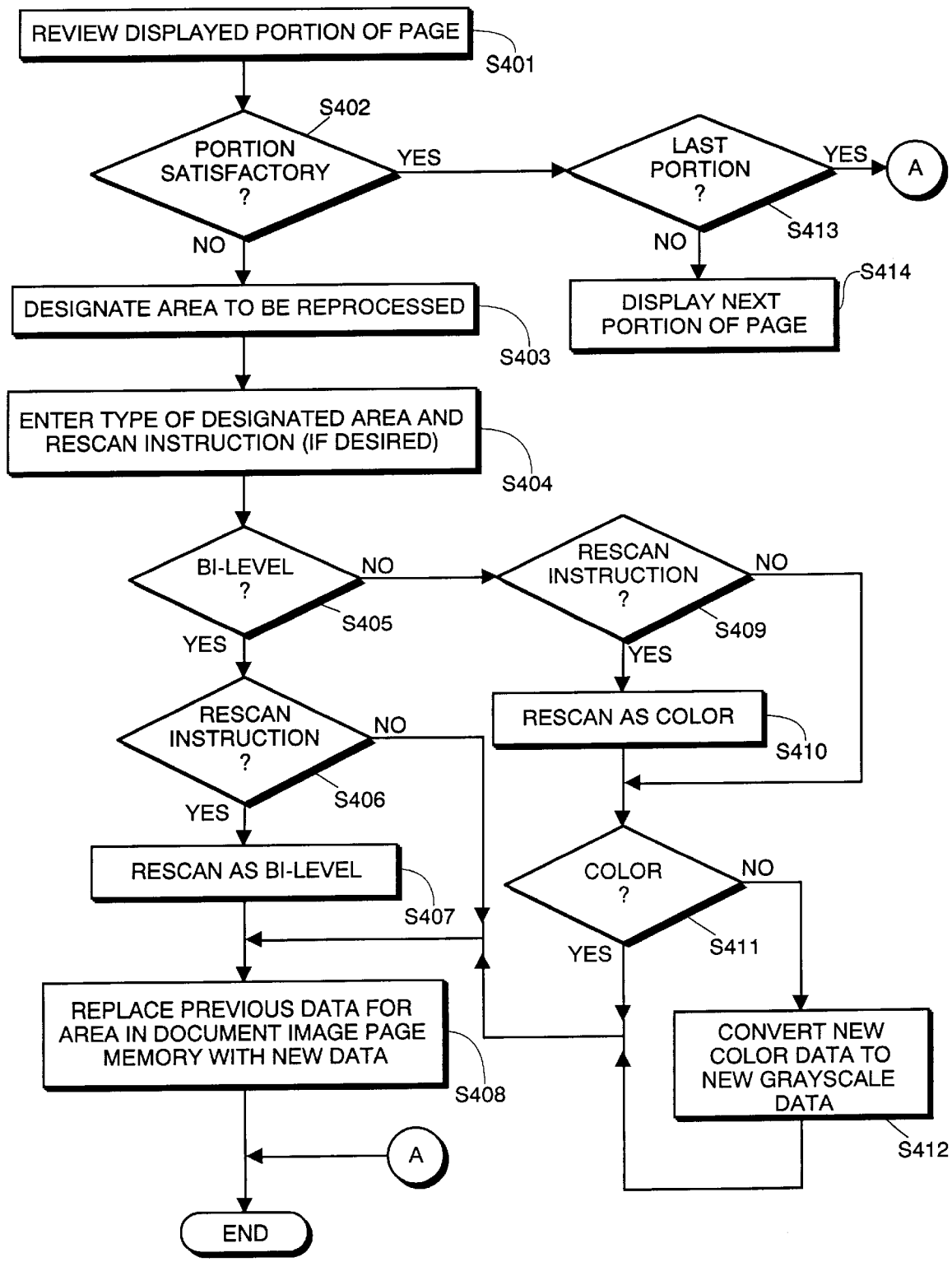

At this point, the display on the monitor 17 should reflect very closely the actual appearance of the original document. However, if it happens that any of the blocks in the document overlap, or if the operator observes any portion which appears not to have been properly scanned or processed (steps S401 and S402 in FIG. 7C), he or she now designates such area by means of the mouse or keyboard inputs 19 (step S403), and enters an instruction for the area to be treated in whatever fashion he or she considers proper (step S404). For example, if the scanner has erroneously identified a particular area as a bi-level block, when it is actually a grayscale block, the operator can designate the block and instruct that it be presented as grayscale information. The operator can, if he or she deems it necessary, instruct that the area should be rescanned for this purpose (step S404). Upon receiving these instructions, the scanner rescans the page using the color sensor 59, if a rescan has been instructed (steps S405, S409 and S410), and modifies the contents of the color page memory 62 accordingly. The new color information is then converted into grayscale data (step S412), which is substituted for the previous bi-level information in the portion of the document image page memory 63 for the area in question (step S408).

Alternatively, if the operator does not order a rescan, the scanner can simply convert the color information stored in the original color scan directly into grayscale information for the designated area and substitute it for the information previously present in the document image page memory for that area (steps S409, S411, S412 and S408).

Once the operator is satisfied with the displayed portion of the page, an instruction to that effect is entered, and the next portion of the page is displayed (steps S413 and S414), and the foregoing processing is repeated as necessary, for the new portion. If the last portion has now met the operator's requirements, the processing is ended.

Once the operator has indicated that the page is satisfactory, the data for the page is ready for storage. In addition to the bi-level, color and grayscale data according to the content of the various blocks identified in the original document, the data for the page includes information derived by the block analysis algorithm, relating to page size, margins, frames, horizontal and vertical lines (their presence, size, length and location), etc. In addition, the algorithm used in the present embodiment defines the blocks of text, color image, etc. in such a manner as to exclude the purely background-color areas of the document as much as possible, thus reducing the amount of information required for the various blocks.

More particularly, the data for the document page includes the size of the page expressed as a frame, whose thickness or width defines the margin of the page. FIG. 10 is a representative view of one way in which the structural information can be arranged. As shown in FIG. 10, for each document the structural information includes a document identifier 51 which is also assigned to the full document image, and by means of which it is intended for the document to be retrieved once its entry into the document image management system is complete. In area 52, information relating to the document type is stored. At 53, all of the information for the document, and its layout within the document, is stored. As shown at 53, for example, for each region are stored a region identifier, a region type, rectangular coordinates that specify the position of the region on the page (here the upper left corner ("ULC") and the lower right corner ("LRC") coordinates), and all related regions (for example, this information may indicate the relation between a text block which contains the legend for a grayscale or full-color illustration, or for a line drawing). In FIG. 10, region 1 corresponds to region 41 in FIG. 3 and, as shown in FIG. 10, includes a "title" type indication, upper left-hand coordinates <0,0>, lower right-hand coordinates <5,40>, and no indication of related regions. The other regions illustrated in FIG. 10 follow similarly.

According to this embodiment, the image data representing the page from the original document can be stored conveniently in a manner based on the TIFF standard. It is particularly contemplated that each block identified by the algorithm as containing bi-level information (text or line drawings), grayscale information, or full color information, will be stored in a respective bit map containing only information of the kind best suited to the image type of the block. The various blocks are associated together in a single image file, with the information in the table shown in FIG. 10 stored in any convenient form consistent with inclusion in a format based on the TIFF standard.

Still further reduction of the total memory space required to store the document can be achieved, by using OCR to reduce textual portions to ASCII codes, or by using standard compression techniques to best advantage where OCR, and hence use of ASCII codes, proves impractical (for example, in the case of text in an unrecognizable font). In addition, grayscale data or full-color data, or both, may be subjected to image compression by any suitable technique that offers sufficient reduction in data quantity to be worthwhile. Finally, any portion of a page whose content is not specified in any of these ways, is understood to be left blank. Thus, blank areas need not be stored.

Even if the use of a vector representation for encoding some of the information (for example, frame and horizontal and vertical line information) may increase the complexity of the file format, nonetheless,.that feature of the invention, particularly when combined with the linked bit map manner of storage and the use of ASCII code storage for text portions to the extent possible, has the advantage of greatly reducing the amount of memory required, especially for documents where the majority of the space on a page is taken up by text or is blank.

The Second Embodiment And Document Capture Therein

Figure 11:
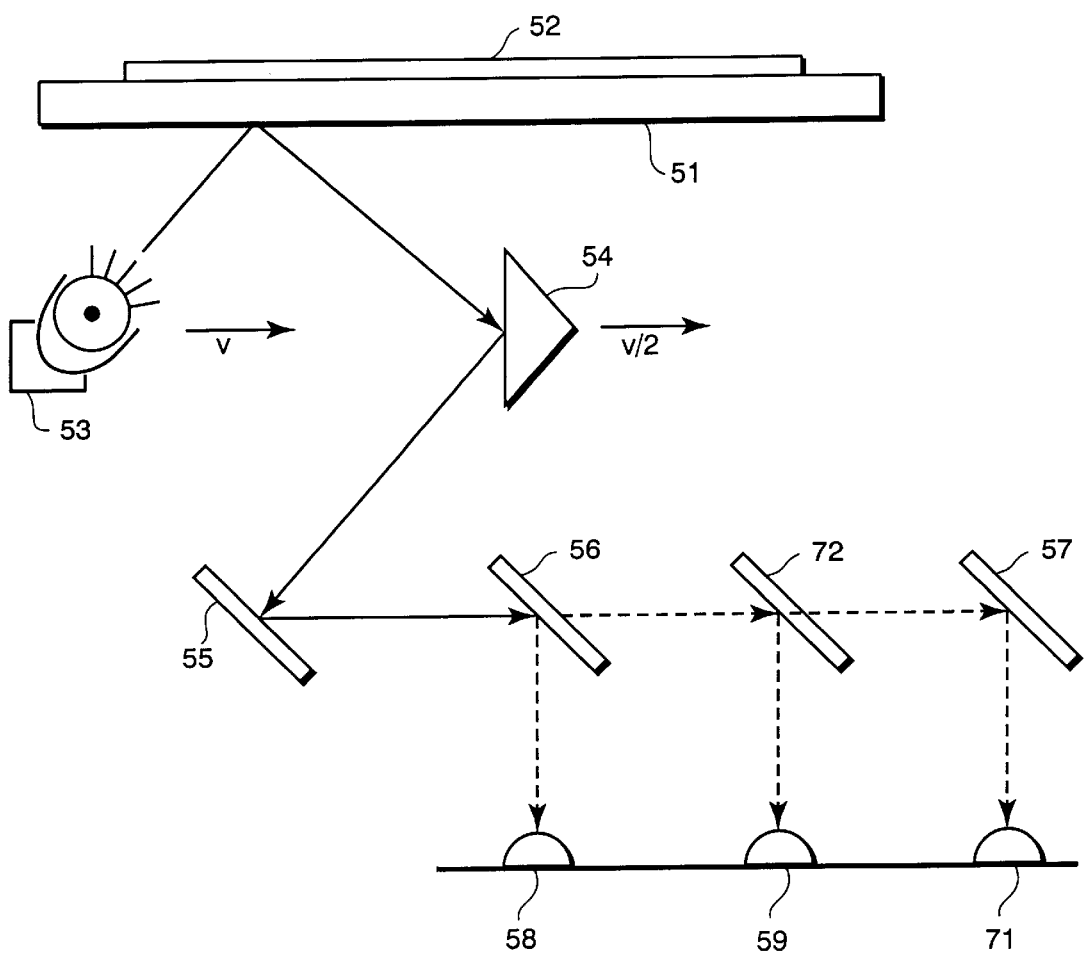
FIG. 11 is a schematic view of a second embodiment of a scanner according to the invention.
Figure 12:
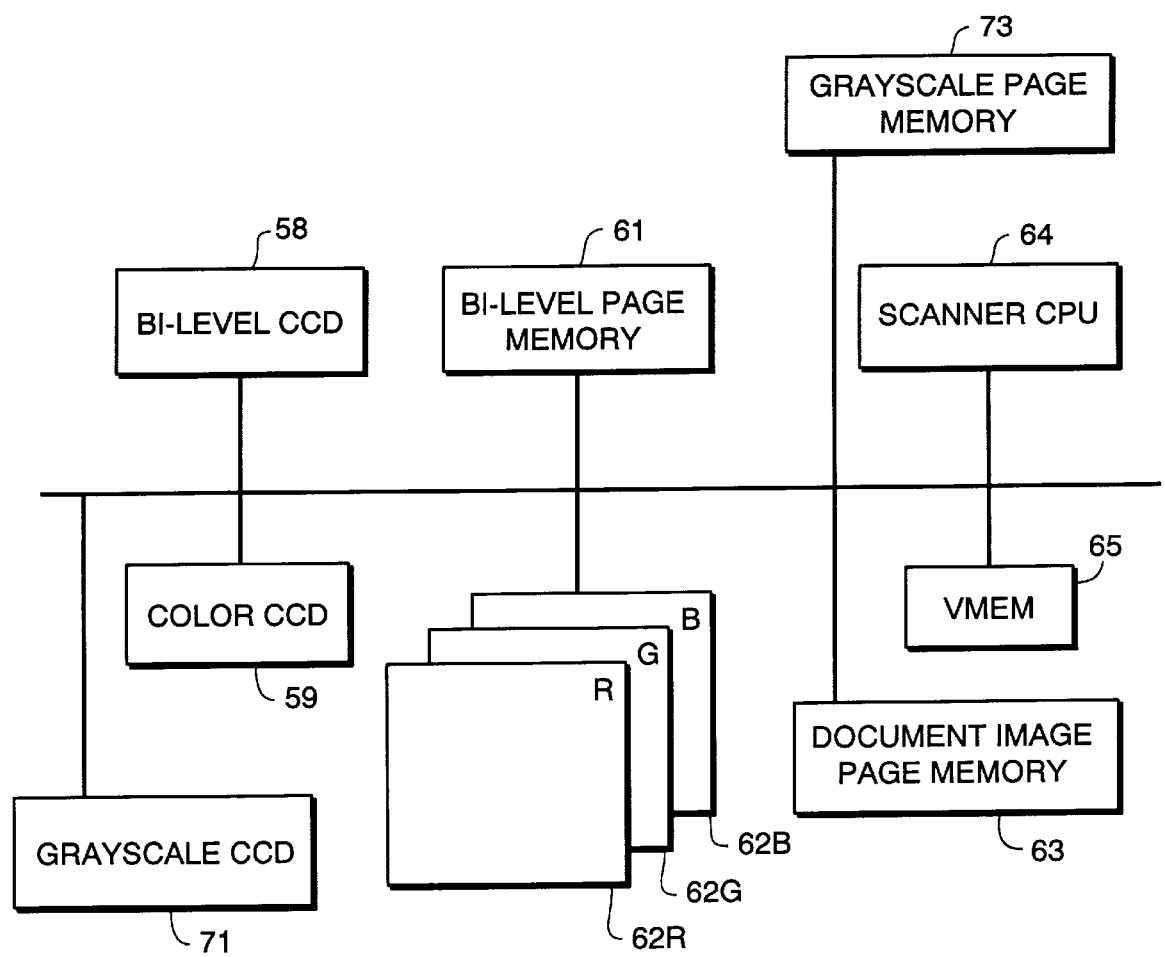
FIG. 12 is a block diagram illustrating the construction of the scanner of FIG. 11.

A second embodiment of a scanner 31 according to the invention is shown in FIGS. 11 and 12. This scanner differs from that of FIGS. 5 and 6 in having three, instead of two, CCD sensors 58, 59 and 71. As in the first embodiment, two of the scanners 58 and 59 are respectively for performing a high-resolution scan of a document to produce bi-level information, and a preferably lower-resolution scan to produce color information. The third CCD sensor 71 is for performing a scan of the document to produce grayscale information directly, rather than having to calculate grayscale information from color data. Preferably, the grayscale sensor 71 has the same resolution as the color sensor 59.

Figure 6:
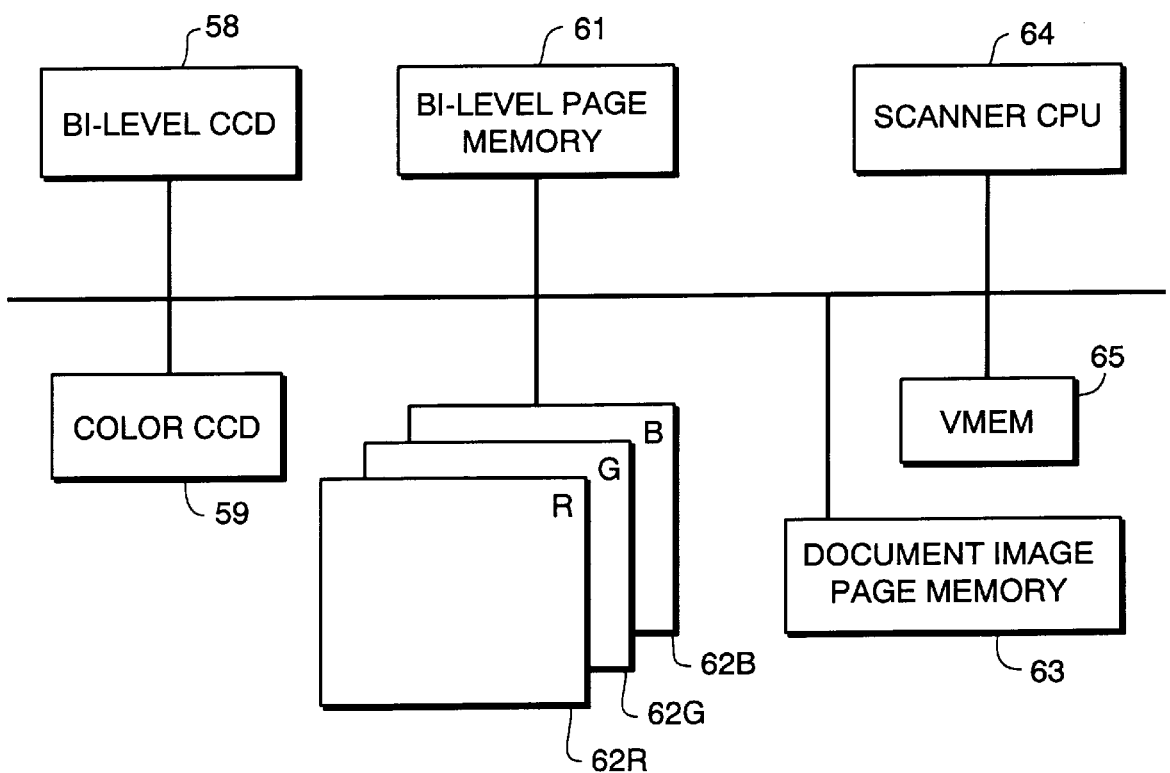
FIG. 6 is a block diagram showing schematically the construction of the scanner of FIG. 5.

The scanner of FIGS. 11 and 12 also differs from that of FIGS. 5 and 6 as having a second movable mirror 72 or the like so that the light reflected from the document can be directed to any of the three sensors. A third page memory 73 is also provided, for grayscale data. The grayscale page memory 73 represents the same number of pixels, with the same number of bits per pixel, as in each color component of the color image data.

Figure 13:
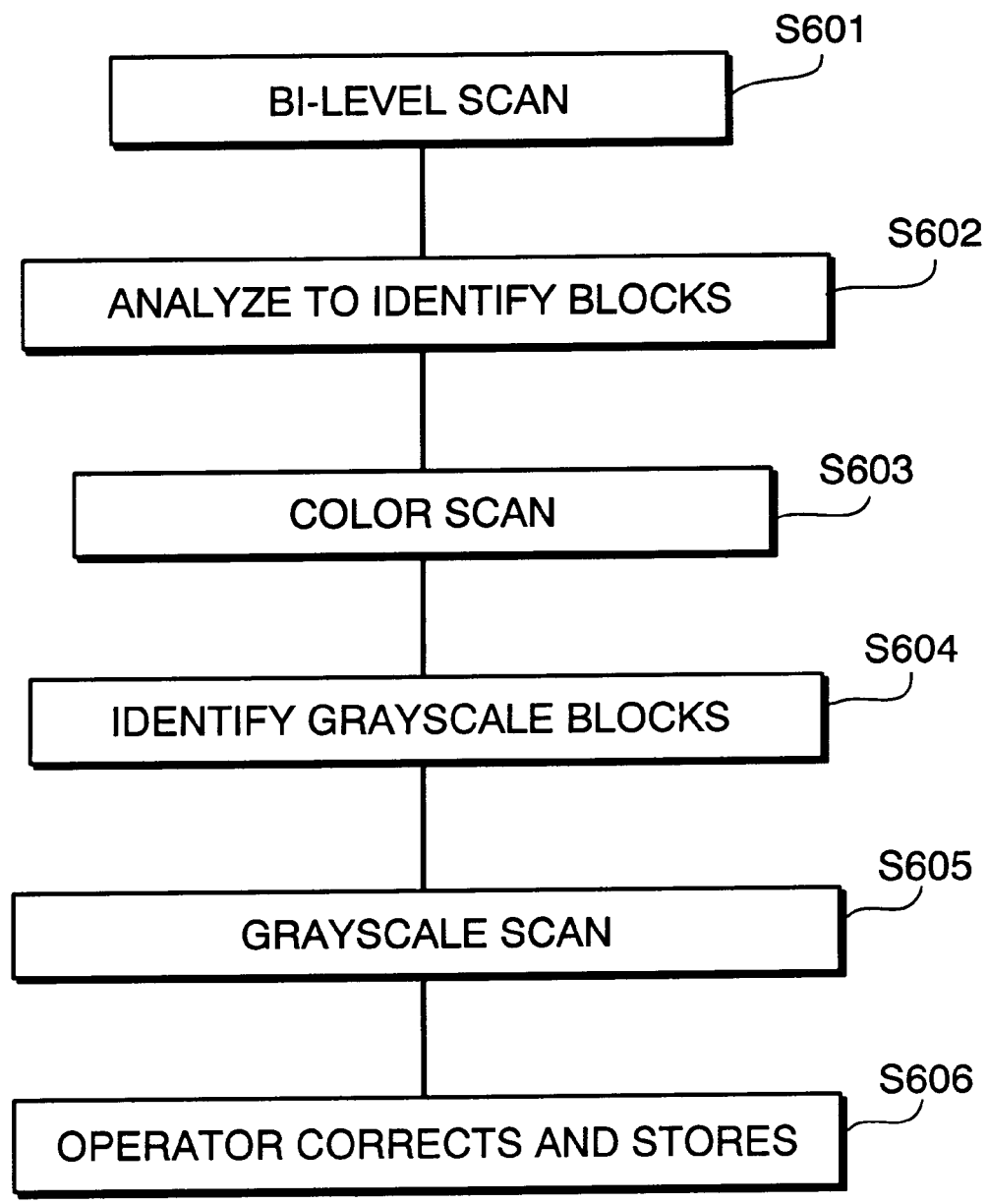
FIG. 13 is a flow chart illustrating the operation of the scanner of FIG. 11.

FIG. 13 is a flowchart illustrating the operation of the sensor of FIG. 11.

As in the first embodiment, the process in this embodiment begins with placement of a document 52 on the platen 51, and entry of an instruction by the operator to commence scanning. First, the scanner positions movable mirror 56 so as to direct light from the document to the bi-level CCD sensor 58 (step S601). Consequently, this sensor outputs a digital signal consisting of one bit per pixel, for each scan line of the document, and this signal is stored in the bi-level page memory 61, and this information is copied into the document image page memory.

The scanner 31 processes this information to identify blocks of common image type in the page (step S602). This analysis is again carried out using the algorithm disclosed in commonly-assigned application Ser. No. 07/873,012. As in the first embodiment, any other algorithm which will perform the desired analysis may be used instead, but the mentioned one is the preferred manner for carrying out this part of the invention.

The monitor 17 then is caused to display an image of one-half or more of the page at a resolution which ordinarily must be considerably below that with which the image was scanned by the bi-level scanner, because most monitors cannot display at 200 dpi. The necessary change in resolution is effected, and the resulting lower-resolution bi-level data is supplied to the video memory 65 and the monitor 17 and displayed. It is again preferable that the scanner adds to the bi-level image data, supplemental data indicating the outlines of the regions identified by the above-mentioned algorithm along with an indication in each as to what type of image content has been identified as residing within the block.

While or after this analysis is performed, the scanner positions movable mirrors 56 and 72 so that light reflected from the original will now be directed to the color scanner 59, and the document is scanned again to obtain color information, which is provided one line at a time by the color sensor to the color page memory 62 (step S603). For each area identified as being color/grayscale in the page, the bi-level information obtained in the first scan is replaced, in the document image page memory 63, with the color information obtained in the second scan, and the information being sent to the video memory 65 and the monitor 17 for display is modified in the same way. Thus, as the color information is received, the color/grayscale areas are displayed on the basis of the color information obtained in the second scan.

As in the first embodiment, the color scan is preferably, but not necessarily, performed at a lower resolution than the bi-level scan, for example, at 60–80 dots per inch.

The scanner now performs an analysis, this time of the color data obtained in the second scan, to determine whether any of the color/grayscale blocks identified in step S602 are actually grayscale rather than color image blocks (step S604). This analysis is performed using the procedure illustrated in the flow chart of FIG. 7B and described above.

If any grayscale blocks are identified in this manner, a third scan is now performed (step S605). For this scan, the movable mirrors 56 and 72 are positioned so that the light from the document 52 is conveyed to the third CCD sensor 71, the grayscale sensor.

In this way the document page is scanned to obtain grayscale information, and that body of information is stored in the grayscale page memory 73. The grayscale information for the areas identified as grayscale blocks is substituted in the document image page memory 63 for the previously obtained color data. The monitor display is also updated in the same way to display the grayscale data for the affected blocks.

At this point, the display on the monitor 17 should reflect the actual appearance of the original document. However, if the operator observes any portion which appears unsatisfactory, he or she now designates such area by means of the mouse or keyboard inputs, and enters an instruction for the area to be treated in whatever fashion he or she considers proper (step S606). This portion of the processing is the same as in the first embodiment, and therefore will not be described in detail again.

Once the displayed portion of the page has been completed to the operator's satisfaction, the operator enters an instruction to end processing of that portion of the page. If the entire page is now satisfactory, the procedure ends, while otherwise, another portion of the page is displayed for the operator's review and correction.

Once the operator has indicated that the page is satisfactory, the data for the page, comprising bi-level, color and grayscale data according to the content of the original document, is ready for storage. Storage of the information for the page is performed in the same manner as in the first embodiment.

The Third Embodiment And Document Capture Therein

Figure 14:
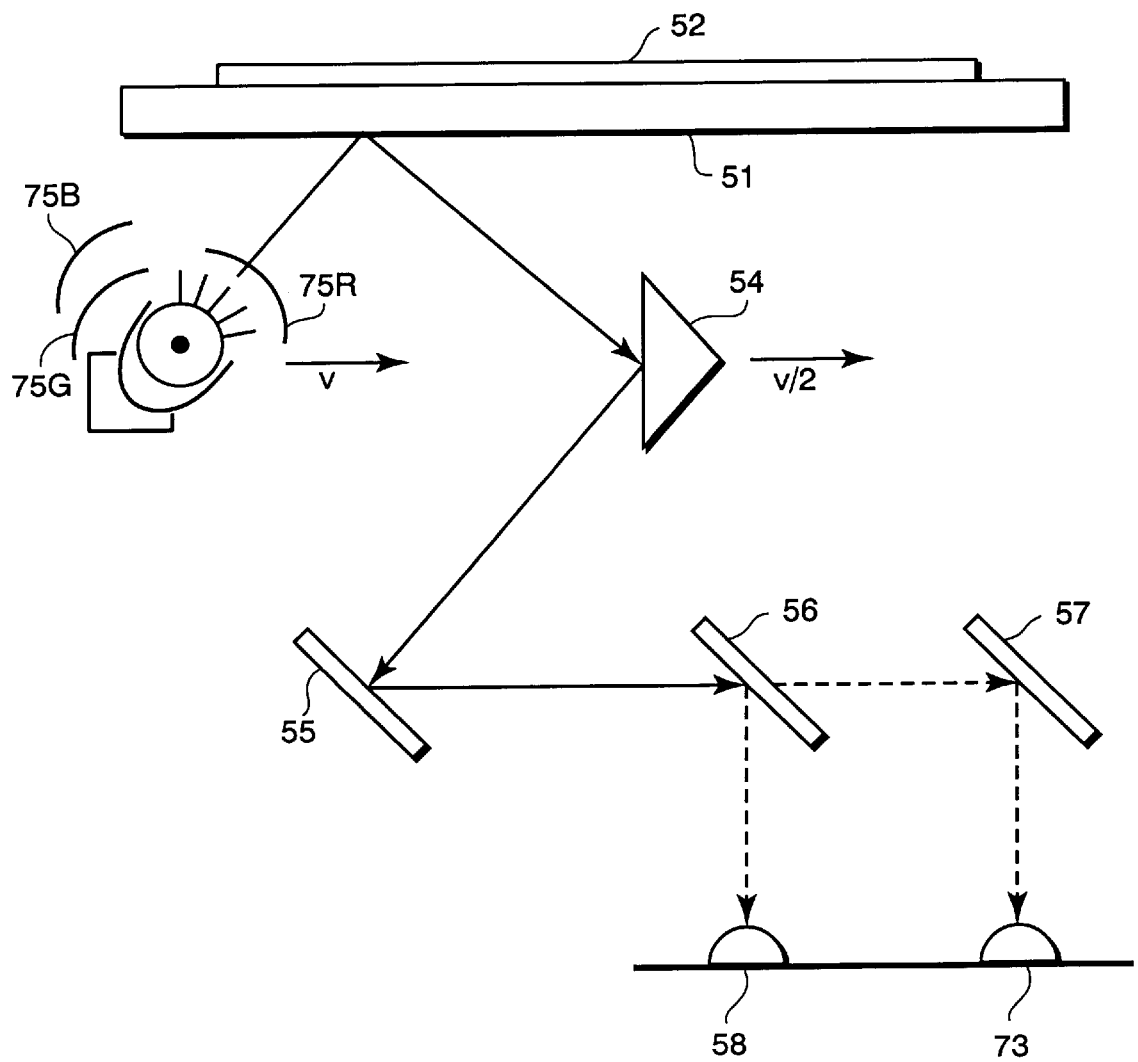
FIG. 14 is a schematic view of a third embodiment of a scanner according to the invention.
Figure 15:
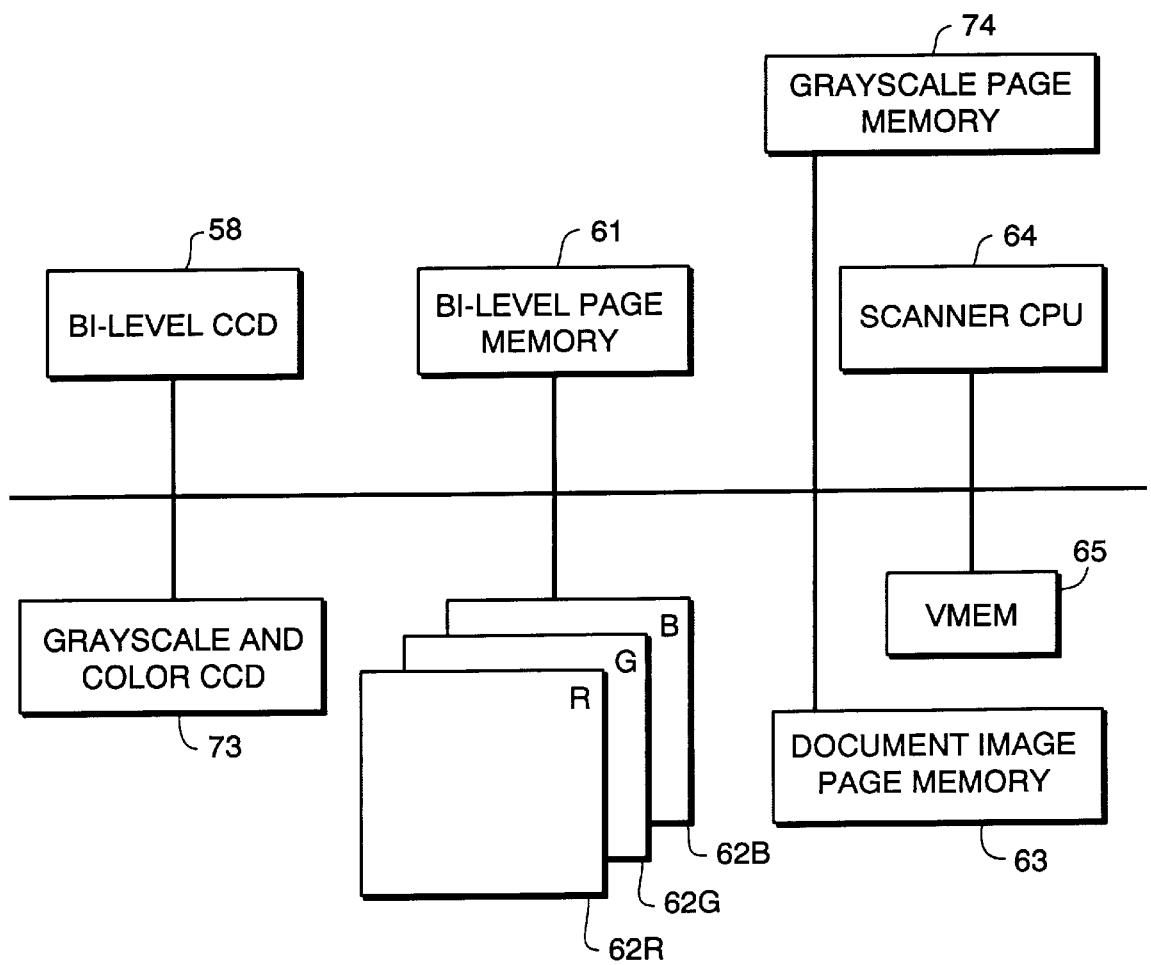
FIG. 15 is a block diagram illustrating the construction of the scanner of FIG. 14.

FIGS. 14 and 15 show a third embodiment of the scanner of the invention. This embodiment is the same as that of FIG. 5 in most respects, and accordingly, only the differences will be described.

This embodiment has only two CCD sensors 58 and 73, one of high and one of low resolution. In this embodiment, the low-resolution CCD sensor 73 is capable of providing both color and grayscale image information. Accordingly, this embodiment has a page memory 74 to receive the grayscale image data read by the second CCD sensor 73 from the document.

The second CCD sensor 73 differs from the low-resolution color sensor 59 of the first embodiment, in not having color filters of different colors covering the light-receiving surface of consecutive pixels. Instead, there are provided three color filters, red, green and blue 75R, 75G and 75B, which can selectively be moved into a position such as to intercept the light as it travels from the light source 53 to the document 52 lying on the platen 51 (in FIG. 15, the red filter 75R is in this position). When the red filter is so positioned, the document is scanned with red light instead of with white light. Consequently, the charge accumulated in the CCD sensor 73 and the signal read out from the sensor 73 represent the red color component of the document image information. The information contained in that signal is of course stored in the red page memory 62R. After the information of one color component has been read in this way, the first filter 75R is moved out of the way, and one of the other two 75G or 75B is interposed in the light path. Since the information for a given color component for an entire page is thus received without interruption by other information in this embodiment, each of the three color-component page memories 62R, 62G and 62B is filled before data begins to be supplied to the next. This is different from the first and second embodiments, in which each pixel of the color CCD sensor produces information relating to a different color component from those to which its two immediate neighbors relate, requiring demultiplexing of the resulting signal into the three color-component page memories in those embodiments.

As in the first and second embodiments, the process in this embodiment begins with placement of a document on the platen 51, and entry of an instruction by the operator to commence scanning. First, the scanner positions the movable mirror 56 so as to direct light from the document to the bi-level CCD sensor 58. Consequently, this sensor outputs a digital signal consisting of one bit per pixel, for each scan line of the document, and this signal is stored in the bi-level page memory 61 and copied into the document image page memory 63.

The scanner 31 processes this information to identify blocks of common image type in the page. This analysis is again carried out using the algorithm disclosed in commonly-assigned application Ser. No. 07/873,012, now U.S. Pat. No. 5,680,479. As in the first two embodiments, any other algorithm which will perform the desired analysis may be used instead, but the mentioned one is the preferred manner for carrying out this part of the invention.

The monitor 17 then is caused to display an image of one-half or more of the page at a resolution which ordinarily must be considerably below that with which the image was scanned by the bi-level scanner, because most monitors cannot display at 200 dpi. The necessary change in resolution is effected, and the resulting lower-resolution bi-level data is supplied to the monitor and displayed. It is again preferable that the scanner adds to the bi-level image data, supplemental data indicating the outlines of the regions identified by the above-mentioned algorithm along with an indication in each as to what type of image content has been identified as residing within the block.

While or after this analysis is performed, the scanner moves the movable mirror 56 so that light reflected from the original will now be directed to the second CCD sensor 73. After the completion of the analysis, the document 52 is scanned again to obtain color information. Actually, three scans of the page are now performed, each being done with a different one of the three filters 75R, 75G and 75B in place, and each providing information of only one color component. The resulting information is provided one line at a time by sensor 73 to the color page memory 62. For each area identified as being color/grayscale in the page, the bi-level information obtained in the first scan is replaced, in the document image page memory 63, with the color information obtained in the color scanning, and the information being sent to the video memory 65 and the monitor 17 for display is modified in the same way. Thus, once the information for all three color components is received, the color/grayscale areas are displayed on the basis of the color information obtained.

As in the previous embodiments, the color scanning is preferably, but not necessarily, performed at a lower resolution than the bi-level scan, for example, at 60–80 dots per inch.

The scanner now performs an analysis of the color data to determine whether any of the color/grayscale blocks are actually grayscale rather than color image blocks. This analysis is performed using the procedure illustrated in the flow chart of FIG. 7B and described above.

If any grayscale blocks are identified in this manner, a third scan is now performed. For this scan, the movable mirror 56 is left in position such that the light from the document is conveyed to the second CCD sensor 73, but the color filters 75 are all withdrawn from the light path, so that the light received by the second CCD sensor 73 represents grayscale information, rather than color information.

In this way the document page is scanned to obtain grayscale information, and that body of information is stored in the grayscale page memory 74. The grayscale information for the areas identified as grayscale blocks is substituted in the document image page memory 63 for the previously obtained color data. The monitor display is also updated in the same way to display the grayscale data for the affected blocks.

At this point, as in the previous embodiments, the operator reviews the processed document and, if any portion of the document appears unsatisfactory, he or she now designates such area by means of the mouse or keyboard inputs 19, and enters an instruction for the area to be treated in whatever fashion he or she considers proper. This portion of the processing is the same as in the first and second embodiments.

Once the displayed portion of the page has been completed to the operator's satisfaction, the operator enters an instruction to end processing of that portion of the page. If the entire page is now satisfactory, the procedure ends, while otherwise, another portion of the page is displayed for the operator's review and correction.

Once the operator has indicated that the page is satisfactory, the data for the page, comprising bi-level, color and grayscale data according to the content of the original document, is ready for storage. Storage of the information for the page is performed in the same manner as in the first embodiment.

The Fourth Embodiment And Document Capture Therein

Figure 16:
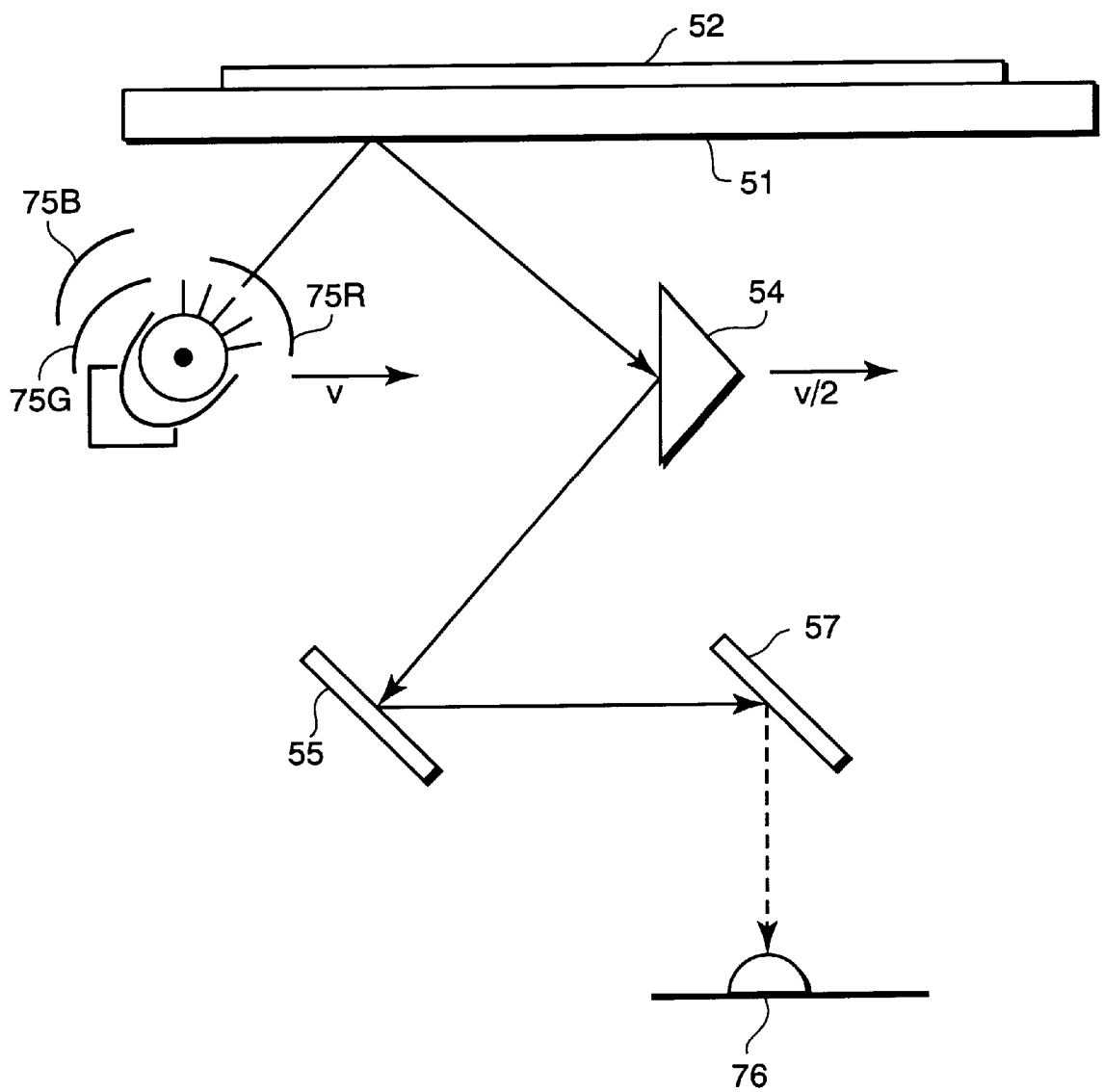
FIG. 16 is a schematic view of a fourth embodiment of a scanner according to the invention.
Figure 17:
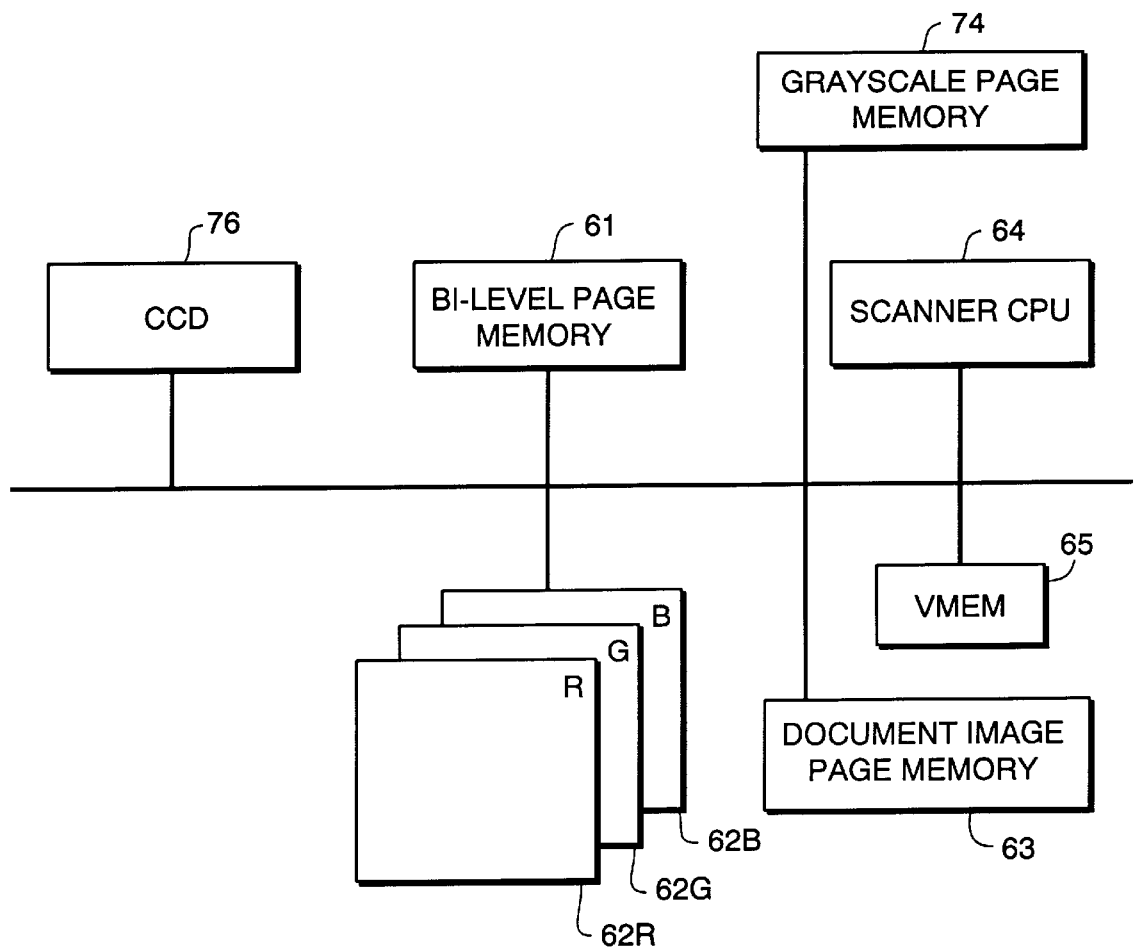
FIG. 17 is a block diagram illustrating the construction of the scanner of FIG. 16.

FIGS. 16 and 17 show a fourth embodiment of the scanner of the invention. This embodiment is the same as that of FIG. 5 in most respects, and accordingly, only the differences will be described.

This embodiment has only one CCD sensor 76. The resolution of this CCD sensor 76 is equal to the highest resolution it is desired to obtain; typically, that will be the bi-level data, as described above. In this embodiment, the single CCD sensor 76 is capable of providing color, grayscale and bi-level image information. Accordingly, this embodiment has a page memory to receive the grayscale image data 74 read by the CCD sensor 76 from the document.

The CCD sensor 76 in this embodiment may be like the high-resolution sensor of the first embodiment. To obtain the high-resolution bi-level data, the CCD sensor 76 is operated exactly as is the bi-level sensor in the first embodiment.

For the lower-resolution grayscale data, the outputs of several pixels of the CCD sensor 76 are combined using, preferably, analog circuitry, that is, before digitization of the signal. For example, if the bi-level CCD sensor 76 has a resolution of 200 dots per inch, and the desired grayscale resolution is 100 dots per inch, then information from two adjacent cells in the CCD 76 can be combined, and the analog data from two successive lines can be combined, for a total of four cells of information being combined for each grayscale pixel.

Also, like the bi-level sensor in the first embodiment, the CCD sensor 76 is not provided with individual color filters accurately positioned on the individual pixels of the sensor. Instead, as in the embodiment of FIGS. 14 and 15, there are provided three color filters, red, green and blue 75R, 75G and 75B, which can selectively be moved into a position such as to intercept the light as it travels from the light source to the document 52 lying on the platen 51 (in FIG. 16, the red filter 75R is in this position). When the red filter 75R is so positioned, the document 52 is scanned with red light instead of with white light. Consequently, the charge accumulated in the CCD sensor 76 and the signal read out from the sensor represent the red color component of the document image information. The information contained in that signal is of course stored in the red page memory 62R. After the information of one color component has been read in this way, the first filter 75R is moved out of the way, and one of the other two 75G or 75B is interposed in the light path. Since the information for a given color component for an entire page is thus received without interruption by other information in this embodiment, each of the three color-component page memories 62R, 62G and 62B is filled before data begins to be supplied to the next. This is different from the first and second embodiments, in which each pixel of the color CCD sensor produces information relating to a different color component from those to which its two immediate neighbors relate, requiring demultiplexing of the resulting signal into the three color-component page memories in those embodiments. In this embodiment, preferably, the outputs of plural adjacent pixels, and of an equal number of successive rows, are combined as in obtaining the grayscale data. This produces color data of lower resolution than the bi-level data.

As in the first, second and third embodiments, the process in this embodiment begins with placement of a document on the platen 51, and entry of an instruction by the operator to commence scanning. First, the CCD sensor 76 outputs a digital signal consisting of one bit per pixel, for each scan line of the document, and this signal is stored in the bi-level page memory 61 and copied into the document image page memory 63.

The scanner processes this information to identify blocks of common image type in the page. This analysis is again carried out using the algorithm disclosed in commonly-assigned application Ser. No. 07/873,012, now U.S. Pat. No. 5,680,479. As in the first three embodiments, any other algorithm which will perform the desired analysis may be used instead, but the mentioned one is the preferred manner for carrying out this part of the invention.

The monitor then is caused to display an image of one-half or more of the page at a resolution which ordinarily must be considerably below that with which the image was scanned by the scanner 76, because most monitors cannot display at 200 dpi. The necessary change in resolution is effected, and the resulting lower-resolution bi-level data is supplied to the monitor and displayed. It is again preferable that the scanner adds to the bi-level image data, supplemental data indicating the outlines of the regions identified by the above-mentioned algorithm along with an indication in each as to what type of image content has been identified as residing within the block.

After the completion of the analysis, the document is scanned again to obtain color information. Actually, three scans of the page 52 are now performed, each being done with a different one of the three filters 75R, 75G and 75B in place, and each providing information of only one color component. The resulting information is provided one line at a time by the CCD sensor 76 to the color page memory 62. For each area identified as being color/grayscale in the page, the bi-level information obtained in the first scan is replaced, in the document image page memory 63, with the color information obtained in the color scanning, and the information being sent to the video memory 65 and the monitor for display is modified in the same way. Thus, once the information for all three color components is received, the color/grayscale areas are displayed on the basis of the color information obtained.

As in the previous embodiments, the color scanning is preferably, but not necessarily, performed at a lower resolution than the bi-level scan, for example, at 60–80 dots per inch.

The scanner now performs an analysis of the color data to determine whether any of the color/grayscale blocks are actually grayscale rather than color image blocks. This analysis is performed using the procedure illustrated in the flow chart of FIG. 7B and described above.

If any grayscale blocks are identified in this manner, a third scan is now performed. For this scan, the color filters 75 are all withdrawn from the light path, so that the light received by the CCD sensor 76 represents grayscale information, rather than color information.

In this way the document page 52 is scanned to obtain grayscale information, and that body of information is stored in the grayscale page memory 74. The grayscale information for the areas identified as grayscale blocks is substituted in the document image page memory 63 for the previously obtained color data. The monitor display is also updated in the same way to display the grayscale data for the affected blocks.

At this point, as in the previous embodiments, the operator reviews the processed document and, if any portion of the document appears unsatisfactory, he or she now designates such area by means of the mouse or keyboard inputs, and enters an instruction for the area to be treated in whatever fashion he or she considers proper. This portion of the processing is the same as in the first, second and third embodiments.

Once the displayed portion of the page has been completed to the operator's satisfaction, the operator enters an instruction to end processing of that portion of the page. If the entire page is now satisfactory, the procedure ends, while otherwise, another portion of the page is displayed for the operator's review and correction.

Once the operator has indicated that the page is satisfactory, the data for the page, comprising bi-level, color and grayscale data according to the content of the original document, is ready for storage. Storage of the information for the page is performed in the same manner as in the first embodiment.

The invention has been described with reference to several embodiments. Many modifications and variations, however, also are within the scope of what the present inventors regard as their invention. Some will now be mentioned briefly.

First, the scanner in the foregoing embodiments performs the processing described above. It is within the scope of the invention for the CPU 11 of the document image management system of which the scanner forms a part, to perform some or all of that processing.

Also, during analysis of the color image information to identify grayscale areas, as described above, an area is so identified only if the scanner finds that the entire block appears to be grayscale image, using the criterion described above with reference to FIG. 7B. As an alternative, the scanner may keep track of the value $J_i$ for each pixel in the block being examined, and if it identifies a region of contiguous pixels within the color block as each separately meeting the criterion for grayscale image ($J_i$<T), the scanner presents the operator with an outline on the monitor display of the region defined by the contiguous grayscale pixels and requests the operator's instruction as to whether the region so indicated should be converted to grayscale data or should be retained as color data.

In addition, while in the foregoing description, bi-level image data is discussed in terms of being black on a white background, it will be appreciated by those skilled in the art that the present invention is fully applicable to documents in which text, line drawings, etc. are printed in some other color than black that makes a sufficiently high contrast with the background, as for example a dark blue on a white background. In such case, it is within the scope of the invention for the apparatus described above to identify the color in the color scan, and to store an indication of that color with the bi-level information.

As another alternative, while the scanner of the three embodiments described in detail above is shown in FIGS. 1 and 2 as being a part of a larger document image management apparatus and system, the scanner, monitor and optical disk system could be used alone for capturing document images, if the scanner is provided with the capability of performing all of the control functions required by those components.

Also, while the foregoing embodiments provide the user with the ability to obtain bi-level, full-color and grayscale information for a document, there may be applications in which it is sufficient to obtain just bi-level and color, without grayscale, or just bi-level and grayscale, without color information. In any such cases, the foregoing embodiments can be modified by removing the unneeded capabilities, thus resulting in a reduction of hardware and software complexity.

While the present invention has been described with reference to the preferred embodiments, many modifications and variations of those embodiments will now be apparent to those skilled in the art. Accordingly, the scope of the present invention is not to be limited by the details of the embodiments described herein, but only by the terms of the appended claims.

What is claimed is:

1. An image scanning apparatus, comprising:
   a first scanning device;
   a second scanning device; and
   an image-content detector, structured and arranged to detect image-type of an image, based on data obtained as a result of a scan of the image by said first scanning device; and
   a control system, for controlling said first and second scanning devices, wherein said control system operates to effect a first scan of an image, in which first scan the image is scanned by said first scanning device, after which, responsive to a detection by said image-content detector that the image contains image content of a particular type, said control system operates to effect a second scan of the image, in which second scan the image is scanned by said second scanning device.

2. An image scanning apparatus according to claim 1, further comprising a third scanning device, and wherein said control system operates to effect a third scan of the image, in which third scan the image is scanned only by said third scanning device.

3. An image scanning apparatus according to claim 1, wherein one of said scanning devices outputs bi-level image information and the other of said scanning devices outputs color image information.

4. An image scanning apparatus according to claim 3, wherein said other of said scanning devices outputs grayscale image information also.

5. An image scanning apparatus, comprising:
   a first sensor;
   a second sensor;
   a scan mechanism;
   an image-content detector, structured and arranged to detect image-type of an image, based on data obtained as a result of said scan mechanism effecting a scan of the image by said first sensor; and
   a control system, for controlling said first and second sensors and said scan mechanism,
   wherein said control system causes said scan mechanism to effect a first scan of an image, in which first scan the image is scanned by said first sensor, after which, responsive to a detection by said image-content detector that the image contains image content of a particular type, said control system causes said scan mechanism to effect a second scan of the image, in which second scan the image is scanned by said second sensor.

6. An image scanning apparatus according to claim 5, further comprising a third sensor, and wherein said control system causes said scan mechanism to effect a third scan of the image in which third scan the image is scanned only by said third sensor.

7. An image scanning apparatus according to claim 5, wherein one of said sensors outputs bi-level image information and the other of said sensors outputs color image information.

8. An image scanning apparatus according to claim 7, wherein said other of said sensors outputs grayscale image information also.

9. An image scanning method, comprising the steps of:
   effecting a first scan of an image, in which first scan the image is scanned by only a first sensor;
   detecting image-type of an image, based on data obtained as a result of the first scan; and
   effecting a second scan of the image, in which second scan the image is scanned only by a second sensor, responsive to a detection in said detecting step that the image contains image content of a particular type.

10. An image scanning method according to claim 9, further comprising the step of effecting a third scan of the image, in which third scan the image is scanned only by a third sensor.

11. An image scanning method according to claim 9, wherein one of the scans produces bi-level image information and the other of the scans produces color image information.

12. An image scanning method according to claim 11, wherein said other of the scans outputs grayscale image information also.

13. An image scanning apparatus, comprising:
   a first sensor;
   a second sensor;
   a scan mechanism;
   a memory, for storage of image data representing the image; and
   an analysis and control system, structured and arranged to detect image-type of an image, based on data obtained as a result of said scan mechanism effecting a scan of the image by said first sensor, and to identify particular portions of the image as being of respective image-types, and for controlling said first and second sensors, said scan mechanism and said memory,
   wherein said analysis and control system causes said scan mechanism to effect a first scan of an image, in which first scan the image is scanned by said first sensor, after which, responsive to a determination by said analysis and control system that the image contains image content of a particular type in at least one portion, said analysis and control system causes said scan mechanism to effect a second scan of the image, in which second scan the image is scanned by said second sensor, and
   wherein said analysis and control system initially causes to be stored in said memory image data obtained by said first sensor for all portions of the image identified, and also causes to be stored in said memory image data obtained by said second sensor, only for portions of the image identified as being the particular image-type.

14. An image scanning apparatus according to claim 13, further comprising a third sensor, and wherein said control system causes said scan mechanism to effect a third scan of the image in which third scan the image is scanned only by said third sensor.

15. An image scanning apparatus according to claim 13, wherein one of said sensors outputs bi-level image information and the other of said sensors outputs color image information.

16. An image scanning apparatus according to claim 15, wherein said other of said sensors outputs grayscale image information also.

17. An image scanning apparatus, comprising:
   a first sensor;
   a second sensor;
   a scan mechanism;
   a display; and
   an analysis and control system, structured and arranged to detect image-type of an image, based on data obtained as a result of said scan mechanism effecting a scan of the image by said first sensor, and to identify particular portions of the image as being of respective image-types, and for controlling said first and second sensors, said scan mechanism and said display,
   wherein said analysis and control system causes said scan mechanism to effect a first scan of an image, in which first scan the image is scanned by said first sensor, after which, responsive to a determination by said analysis and control system that the image contains image content of a first and second types in at least first and second respective portions, said control system causes said scan mechanism to effect a second scan of the image, in which second scan the image is scanned by said second sensor, and wherein said analysis and control system initially causes the image to be displayed by said display, using image data obtained by said first sensor for portions of the image identified as being of the first image-type, and using image data obtained by said second sensor, only for portions of the image identified as being the second image-type.

18. An image scanning apparatus according to claim 17, further comprising a third sensor, and wherein said control system causes said scan mechanism to effect a third scan of the image in which third scan the image is scanned only by said third sensor.

19. An image scanning apparatus according to claim 17, wherein one of said sensors outputs bi-level image information and the other of said sensors outputs color image information.

20. An image scanning apparatus according to claim 19, wherein said other of said sensors outputs grayscale image information also.

21. An image scanning apparatus, comprising:

a first sensor;

a second sensor;

a scan mechanism;

a memory, for storage of image data representing the image; and an analysis and control system, structured and arranged to detect image-type of an image, based on data obtained as a result of said scan mechanism effecting a scan of the image by said first sensor, and to identify particular portions of the image as being of respective image-types, and for controlling said first and second sensors, said scan mechanism and said memory, wherein said analysis and control system causes said scan mechanism to effect a first scan of an image, in which first scan the image is scanned by said first sensor, after which, responsive to a determination by said analysis and control system that the image contains image content of a particular type in at least one portion, said control system causes said scan mechanism to effect a second scan of the image, in which second scan the image is scanned by said second sensor, and wherein said analysis and control system initially causes to be stored in said memory image data obtained by said first sensor for all portions of the image identified, and causes to be stored in said memory image data obtained by said second sensor, only for portions of the image identified as being the particular image-type, and wherein the image data is stored in said memory in respective bit maps for respective portions of the image, the respective bit maps being linked in said memory.

22. An image scanning apparatus according to claim 21, further comprising a third sensor, and wherein said control system causes said scan mechanism to effect a third scan of the image in which third scan the image is scanned only by said third sensor.

23. An image scanning apparatus according to claim 21, wherein one of said sensors outputs bi-level image information and the other of said sensors outputs color image information.

24. An image scanning apparatus according to claim 23, wherein said other of said sensors outputs grayscale image information also.

25. An image scanning method, comprising the steps of:

effecting a first scan of an image, in which first scan an image is scanned only by a first sensor;

detecting image-type of the image, based on data obtained as a result of said effecting step, and identifying particular portions of the image as being of respective image-types;

effecting a second scan of the image, in which second scan the image is scanned only by a second sensor, responsive to a determination in said detecting and identifying step that the image contains image content of a particular type in at least one portion;

storing in a memory image data obtained in the first scan for all portions of the image identified; and storing in a memory image data obtained in the second scan, only for portions of the image identified as being the particular image-type.

26. An image scanning method according to claim 25, further comprising the step of effecting a third scan of the image, in which third scan the image is scanned only by a third sensor.

27. An image scanning method according to claim 25, wherein one of the scans produces bi-level image information and the other of the scans produces color image information.

28. An image scanning method according to claim 27, wherein said other of the scans produces grayscale image information also.

29. An image scanning method, comprising the steps of:

a first sensor;

a second sensor;

a scan mechanism;

a display; and effecting a scan of the image using only a first sensor;

detecting image-type of an image, based on data obtained in the first scan, and identifying particular portions of the image as being of respective image-types;

effecting a second scan of the image, in which second scan the image is scanned using only a second sensor, responsive to a determination by said analysis and control system that the image contains image content of a first and second types in at least first and second respective portions; and displaying the image using image data obtained in the first scan for portions of the image identified as being of the first image-type, and using image data obtained in the second scan, only for portions of the image identified as being the second image-type.

30. An image scanning method according to claim 29, further comprising the step of effecting a third scan of the image, in which third scan the image is scanned only by a third sensor.

31. An image scanning method according to claim 29, wherein one of the scan produces bi-level image information and the other of the scans produces color image information.

32. An image scanning method according to claim 31, wherein said other of the scans produces grayscale image information also.

33. An image scanning method, comprising the steps of:

effecting a first scan of an image, in which first scan the image is scanned using only a first sensor;

detecting image-type of an image, based on data obtained in the first scan, and identifying particular portions of the image as being of respective image-types;

effecting a second scan of the image, in which second scan the image is scanned only using a second sensor, responsive to a determination in said detecting and identifying step that the image contains image content of a particular type in at least one portion; and initially storing in a memory image data obtained in the first scan for all portions of the image identified, and storing in the memory image data obtained in the second scan, only for portions of the image identified as being the particular image-type, wherein the image data is stored in respective bit maps for respective portions of the image, the respective bit maps being linked in the memory.

34. An image scanning method according to claim 33, further comprising the step of effecting a third scan of the image, in which third scan the image is scanned using only a third sensor.

35. An image scanning method according to claim 33, wherein one of the scans produces bi-level image information and the other of the scans produces color image information.

36. An image scanning method according to claim 35, wherein said other of the scans produces grayscale image information also.

37. An image scanning apparatus, comprising:
a color sensor;
a scan mechanism;
a memory, for storage of image data representing the image; and
an analysis and control system, structured and arranged to detect grayscale portions of an image, based on data obtained as a result of said scan mechanism effecting a scan of the image by said color sensor, and to identify particular portions of the image as being of respective image-types, and for controlling said color sensor, said scan mechanism and said memory,
wherein said analysis and control system causes said scan mechanism to effect a first scan of an image, in which first scan the image is scanned by said color sensor, after which, responsive to a detection that the image contains grayscale image in at least one portion, said analysis and control system converts the color image data obtained for that portion by said color scanner to grayscale data, and
wherein said analysis and control system causes to be stored in said memory image data obtained by said color sensor for non-grayscale portions of the image and causes to be stored in said memory the grayscale image data for any portion of the image identified as being grayscale image.

38. An image scanning method, comprising the steps of:
effecting a first scan of an image, in which first scan the image is scanned using a color sensor;
detecting grayscale portions of an image, based on data obtained from the scan of the image using the color sensor, and identifying particular portions of the image as being of respective image-types;
responsive to a detection that the image contains grayscale image in at least one portion, converting the color image data obtained for that portion by said color scanner to grayscale data; and
storing in a memory image data obtained using the color sensor for non-grayscale portions of the image and storing in the memory the grayscale image data for any portion of the image identified as being grayscale image.

39. An image scanning apparatus, comprising:
a sensor interface;
a memory; and
a control system which, based on image information from said sensor interface, identifies image portions of a document as being of at least text and non-text image types, and which causes image data representing the image portions of the document to be stored in said memory,
wherein said control system organizes the image data in a set of linked memory areas each containing information of only one image type and pertaining to only one of the identified image portions of the document, and excludes from the memory areas information representing background portions of the document, and
wherein each said memory area stores image data in a storage format dependent upon the type of image data stored therein, the storage formats including at least a first format for text image data and at least a second and different format for non-text image data.

40. An image scanning apparatus, comprising:
a sensor interface;
a memory; and
a control system which, based on image information from said sensor interface, identifies image portions of a document as being of at least text and non-text image types, and which causes image data representing the image portions of the document and location data representing locations of the image portions in the document to be stored in said memory,
wherein said control system organizes the image data and the location data in a set of linked memory areas each containing information of only one image type and pertaining to only one of the identified image portions of the document, and
wherein each said memory area stores image data in a storage format dependent upon the type of image data stored therein, the storage formats including at least a first format for text image data and at least a second and different format for non-text image data,
whereby a reproduction of the document, including both text and non-text image types, can be generated from the stored image data and the stored location data.

41. An image scanning apparatus according to claim 40, wherein said control system further organizes the image data representing the document to include in a vector representation storage format, information representing any frames, horizontal straight lines and vertical straight lines in the document.

42. An image scanning apparatus according to claim 40, wherein non-text image data is stored in at least two different storage formats, and wherein each memory area stores the non-text image data in one of the at least two different storage formats dependent upon the type of non-text image data stored therein.

43. An image scanning method, comprising the steps of:
identifying image portions of a document as being of at least text and non-text image types, based on information obtained by scanning the document; and
storing image data and location data in a memory, the image data representing image portions of the document and the location data representing locations of the image Portions in the document,
wherein said storing step further comprises organizing the image data and the location data for storage in a set of linked memory areas each containing information of only one image type and pertaining to only one of the identified image portions of the document, wherein each said memory area stores image data in a storage format dependent upon the type of image data stored therein, the storage formats including at least a first format for text image data and at least a second and different format for non-text image data, and whereby a reproduction of the document, including both text and non-text image types, can be generated from the stored image data and the stored location data.

44. An image scanning method according to claim 43, wherein, in said storing step, the image data representing the document is further organized to include in a vector representation storage format, information representing any frames, horizontal straight lines and vertical straight lines in the document.

45. An image scanning method according to claim 43, wherein non-text image data is stored in at least two different storage formats, and wherein each memory area stores the non-text image data in one of the at least two different storage formats dependent upon the type of non-text image data stored therein.

46. An image scanning method, comprising:

identifying image portions of a document as being of at least text and non-text image types, based on information obtained by scanning the document; and storing image data in a memory, the image data representing image portions of the document and location data representing locations of the image portions in the document, wherein the storing step further comprises organizing the image data and the location data for storage in a set of linked memory areas each containing information of only one image type and pertaining to only one of the identified image portions of the document, and excludes from the memory areas information representing background portions of the document, and wherein each said memory area stores image data in a storage format dependent upon the type of image data stored therein, the storage formats including at least a first format for text image data and at least a second and different format for non-text image data.

* * * * *